(12) United States Patent
Kim et al.

(10) Patent No.: US 11,773,610 B2
(45) Date of Patent: Oct. 3, 2023

(54) CONCRETE STRUCTURE STRENGTHENED USING GRID REINFORCEMENT MATERIAL AND NON-SHRINK GROUT AND METHOD OF STRENGTHENING THE SAME

(71) Applicant: KOREA INSTITUTE OF CIVIL ENGINEERING AND BUILDING TECHNOLOGY, Gyeonggi-Do (KR)

(72) Inventors: Hyeong Yeol Kim, Gyeonggi-do (KR); Gum Sung Ryu, Gyeonggi-do (KR); Young Jun You, Gyeonggi-do (KR); Gi Hong An, Gyeonggi-do (KR)

(73) Assignee: KOREA INSTITUTE OF CIVIL ENGINEERING AND BUILDING TECHNOLOGY, Gyeonggi-do (KR)

( * ) Notice: Subject to any disclaimer, the term of this patent is extended or adjusted under 35 U.S.C. 154(b) by 127 days.

(21) Appl. No.: 17/338,679

(22) Filed: Jun. 4, 2021

(65) Prior Publication Data
US 2022/0186510 A1    Jun. 16, 2022

(30) Foreign Application Priority Data
Dec. 14, 2020 (KR) .................. 10-2020-0173952

(51) Int. Cl.
| | |
|---|---|
| *E04G 23/02* | (2006.01) |
| *C04B 18/14* | (2006.01) |
| *C04B 24/24* | (2006.01) |
| *C04B 28/08* | (2006.01) |
| *E04B 1/94* | (2006.01) |
| *E04C 5/07* | (2006.01) |

(Continued)

(52) U.S. Cl.
CPC ........ *E04G 23/0218* (2013.01); *C04B 18/146* (2013.01); *C04B 24/24* (2013.01);
(Continued)

(58) Field of Classification Search
CPC ............ E04G 23/0218; E04G 23/0211; C04B 18/146; C04B 28/082; C04B 2111/34;
(Continued)

(56) References Cited

U.S. PATENT DOCUMENTS

| | | | | |
|---|---|---|---|---|
| 4,352,262 A | * | 10/1982 | Edelmann | ........... E04G 23/0211 52/742.16 |
| 4,598,523 A | * | 7/1986 | Tolliver | .................... E04C 5/20 52/685 |

(Continued)

*Primary Examiner* — Gisele D Ford
(74) *Attorney, Agent, or Firm* — JCIPRNET

(57) ABSTRACT

The present disclosure provides a concrete structure strengthened using a grid reinforcement material and non-shrink grout and a method of strengthening the same in which, when strengthening a concrete structure such as a concrete slab or a concrete wall body that is damaged or deteriorated, a grid reinforcement material is mounted on one side of the concrete structure, a formwork is formed on an outer side of the grid reinforcement material to have a required gap, and then the gap is filled with non-shrink grout so that the non-shrink grout is cured therein to strengthen the old concrete structure, thereby being able to automatically fill and repair cracks formed in the concrete structure just by injecting the non-shrink grout without separately performing crack repair on the old concrete structure. Also, the grid reinforcement material may be easily fixed or mounted using a grid fixing device and may be easily applied to strengthening of a concrete structure having a curved surface as well as a concrete structure having a flat surface such as a concrete slab or a concrete wall body. In addition, reinforcing bars may be additionally arranged in a gap between a surface of the concrete structure and the grid reinforcement material so that the grid reinforcement material increases a cover thickness, and thus the concrete structure is remarkably strengthened.

17 Claims, 20 Drawing Sheets

(51) Int. Cl.
*F16B 15/00* (2006.01)
*C04B 103/30* (2006.01)
*C04B 111/34* (2006.01)
*E04C 5/16* (2006.01)
*E04C 5/20* (2006.01)

(52) U.S. Cl.
CPC .............. *C04B 28/082* (2013.01); *E04B 1/94* (2013.01); *E04C 5/07* (2013.01); *E04G 23/0211* (2013.01); *F16B 15/00* (2013.01); *C04B 2103/302* (2013.01); *C04B 2111/34* (2013.01); *E04C 5/168* (2013.01); *E04C 5/206* (2013.01)

(58) Field of Classification Search
CPC ... E04C 5/07; E04C 5/168; E04C 5/20; E04C 5/206; E04C 5/16
See application file for complete search history.

(56) References Cited

U.S. PATENT DOCUMENTS

| | | | | |
|---|---|---|---|---|
| 5,749,200 A | * | 5/1998 | Fukuoka | ............. E04G 23/0218 52/223.6 |
| 8,443,567 B2 | * | 5/2013 | Swenson | ................. E04C 5/168 404/136 |
| 8,479,468 B1 | * | 7/2013 | Abbasi | ............... E04G 23/0218 52/412 |
| 11,193,278 B2 | * | 12/2021 | Kim | ..................... E04G 23/0233 |
| 2009/0044476 A1 | * | 2/2009 | Agneloni | ............ E04G 23/0218 52/745.05 |
| 2009/0165418 A1 | * | 7/2009 | Verelli | .................... E04C 5/203 52/649.1 |
| 2010/0043337 A1 | * | 2/2010 | Banks | ..................... E04C 5/208 52/649.8 |
| 2011/0067344 A1 | * | 3/2011 | Swenson | ................. E04C 5/168 52/677 |
| 2011/0120045 A1 | * | 5/2011 | Gavin | ..................... E04C 5/203 52/677 |
| 2015/0167332 A1 | * | 6/2015 | Shiota | ................... E04G 23/0218 52/514 |
| 2016/0053492 A1 | * | 2/2016 | Leinenbach | .............. E04C 5/07 52/223.14 |
| 2016/0222663 A1 | | 8/2016 | Mauz et al. | |
| 2019/0136389 A1 | * | 5/2019 | Kim | ...................... C23F 13/18 |
| 2019/0153728 A1 | * | 5/2019 | Kim | ........................ E04G 23/0218 |
| 2020/0040580 A1 | * | 2/2020 | Kim | .......................... E04B 5/32 |
| 2021/0062508 A1 | * | 3/2021 | Kim | .......................... E04C 5/07 |

* cited by examiner

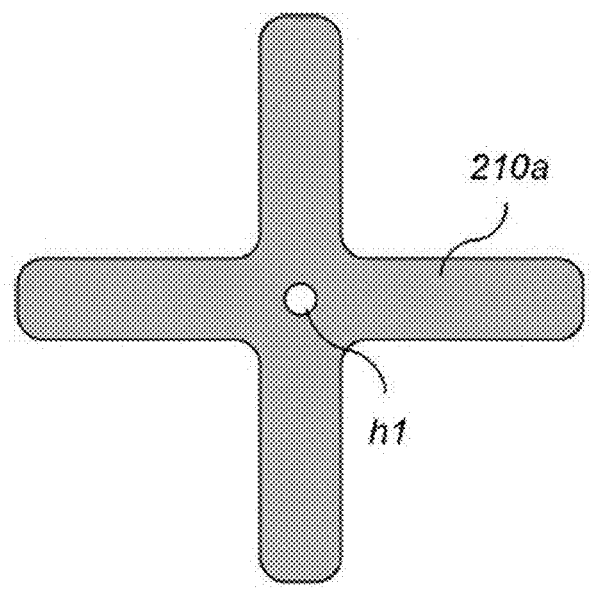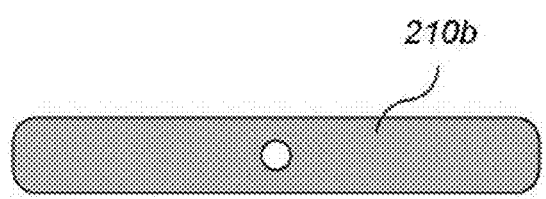
FIG. 5A    FIG. 5B
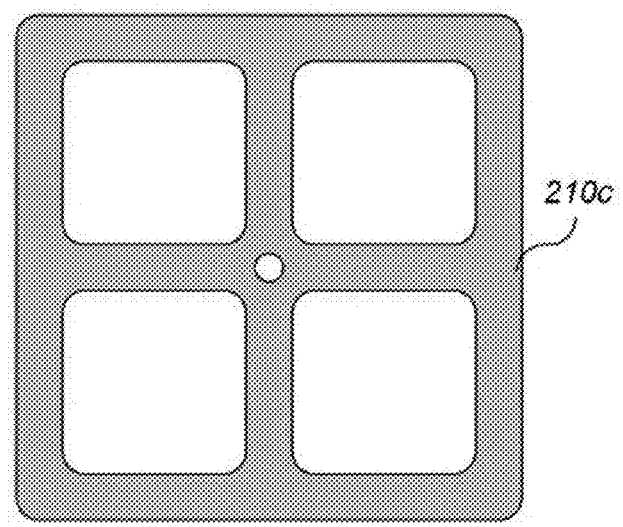
FIG. 5C

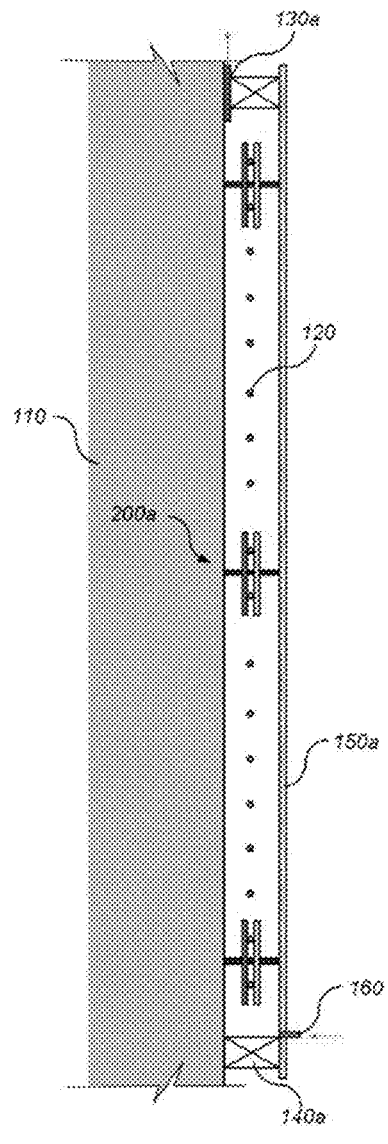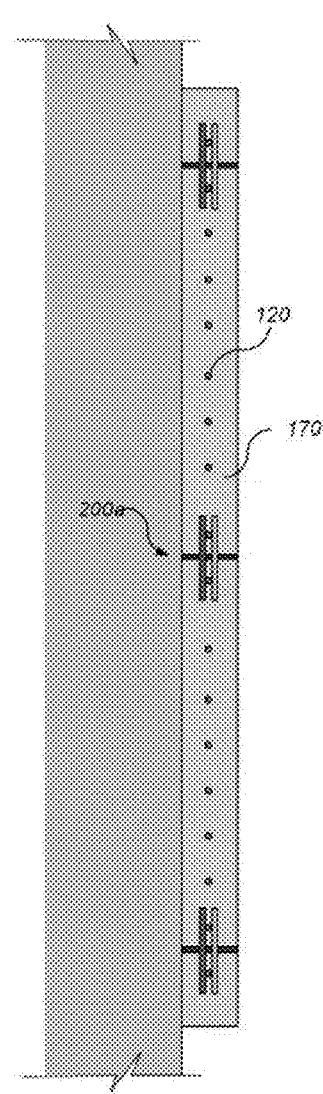
FIG. 13A  FIG. 13B  FIG. 13C

CONCRETE STRUCTURE STRENGTHENED USING GRID REINFORCEMENT MATERIAL AND NON-SHRINK GROUT AND METHOD OF STRENGTHENING THE SAME

CROSS-REFERENCE TO RELATED APPLICATION

This application claims priority to and the benefit of Korean Patent Application No. 10-2020-0173952, filed on Dec. 14, 2020, the disclosure of which is incorporated herein by reference in its entirety.

BACKGROUND

1. Field of the Invention

The present disclosure relates to a concrete structure strengthened using a grid reinforcement material and non-shrink grout, and more particularly, to a concrete structure and a method of strengthening the same in which, when strengthening a concrete structure such as a concrete slab or a concrete wall body that is damaged or deteriorated, filling with a textile grid reinforcement material and non-shrink grout is performed, wherein a grid reinforcement material is mounted on one side of the concrete structure, a formwork is formed on an outer side of the grid reinforcement material to have a required gap, and then the gap is filled with non-shrink grout so that the non-shrink grout is cured therein to strengthen the old concrete structure.

2. Discussion of Related Art

Structural strengthening should be performed when damage occurs in infrastructure, buildings, or the like or when revision of design standards or an increase in service load that was not reflected at the time of design occurs.

In a general facility strengthening method, section enlargement is performed on or a reinforcement material is added to an outer side of an existing section. The facility strengthening method according to the related art can be applied when a working space is sufficient and there is no limit to the working period but has a limitation in application to facilities that lack the working space and require rapid construction.

Meanwhile, various strengthening techniques are applied to strengthen old concrete facilities. Here, in order to minimize space loss due to strengthening, techniques utilizing reinforcement materials having a small thickness are preferred. This is because, for example, in the case of tunnels or subway structures, strengthening with reinforcement materials having a large size or volume may make it difficult for vehicles to pass, and in the case of box culverts, a cross-sectional area of water flow may decrease.

Among various strengthening techniques, a technique in which a high-strength carbon fiber in the form of a sheet or panel is bonded is common, and a technique in which a high-strength carbon fiber is made thin and bonded to an exterior of a structure using an adhesive is common.

Here, the carbon fiber is a high-strength fiber of which 90% or more is made of carbon and is widely used in the aviation, automobile, and construction industries due to having a strength that is about 10 times higher than the strength of iron despite having a weight that is about ⅕ of the weight of iron. In a conventional technique of strengthening an old structure utilizing the carbon fiber, a sheet or panel made of the carbon fiber is attached to the structure by utilizing an organic adhesive such as epoxy resin. Meanwhile, in recent years, a technique has been introduced in which a textile reinforcement concrete panel is mounted on an outer side of an old structure and then a gap therebetween is filled with grout to strengthen the old structure.

FIGS. 1A and 1B are views for describing a method of strengthening a concrete structure using a grid reinforcement material and mortar spraying according to the related art. FIG. 1A is a picture showing spraying of mortar to strengthen a structure, and FIG. 1B is a cross-sectional view showing a concrete structure using a grid reinforcement material and mortar spraying.

As illustrated in FIGS. 1A and 1B, in recent years, a strengthening technique has been introduced in which a textile reinforcement material (20) is mounted on an outer side of an old structure (10) and mortar (30) is sprayed on the textile reinforcement material (20).

Meanwhile, in the case of a technique in which a composite material panel or a carbon fiber sheet is bonded to a structure using an organic adhesive to strengthen the structure, there is a concern that the structure may collapse in the event of a fire due to low fire resistance and toxic gas generation that occurs as the organic adhesive burns. Also, the bonding technique has problems in that it cannot be applied to a structure with a wet surface such as an underground structure, and in particular, when a portion to which the composite material panel or carbon fiber sheet is bonded is exposed to moisture, the composite material panel or carbon fiber sheet is detached.

Also, in the case of a strengthening technique using textile reinforcement concrete panels, although the concrete panels are made of an incombustible material and thus have excellent fire resistance, the concrete panels are heavy and thus difficult to construct, and methods of connecting the concrete panels are very limited. In addition, there is a limitation in applying the concrete panels when there is a change in an exterior of a structure such as when a curved surface is present.

Meanwhile, FIGS. 2A and 2B are views showing an example of a concrete structure that needs to be strengthened. FIG. 2A shows a coastal structure having a damaged concrete slab section, and FIG. 2B is a picture showing a portion marked with "A" in FIG. 2A in detail.

As illustrated in FIG. 2A, in a pier-type berth facility constructed at a port, reinforcing bars are easily corroded due to a chloride, and when the reinforcing bars are corroded, a concrete cover is detached as illustrated in FIG. 14B due to an expansion pressure of a corroded section. When the reinforcing bar cover is detached, the reinforcing bars are exposed and thus corrosion thereof due to a chloride is further accelerated.

Specifically, as illustrated in FIG. 2B, when a defect in a section occurs due to damage or the like to a concrete slab, the defective section is filled with a reinforcement material such as reinforcement mortar. Also, when a technique of attaching a fiber reinforcement panel or the like is applied, a scaffold or the like should be installed on a lower portion of the facility to allow a worker to perform the task. However, in the case of a port structure, installing a scaffold is not possible, and in the case of a high water level (HWL), a worker is unable to approach the lower portion of the facility. Therefore, the working space and working time are very limited.

In addition, in the case of a mortar spraying technique, a working space should be secured, but when working conditions are poor as on a lower surface of a slab of a pier of a port structure as illustrated in FIG. 2A, spraying is difficult, and a problem may occur in which residual mortar leaks into the marine environment due to rebounding. Also, when cracks are present in the old structure, the cracks should be repaired using a filling technique or the like before performing the spraying technique.

RELATED ART DOCUMENTS

Patent Documents (Patent Document 0001) Korean Patent Registration No. 10-2096032 (Date of Registration: Mar. 26, 2020), Title of Invention: "Anchor pin for placing shotcrete and fixing textile grid, and shotcrete construction method for reinforcing textile grid using the same"
(Patent Document 0002) Korean Patent Registration No. 10-1612800 (Date of Registration: Apr. 8, 2016), Title of Invention: "Technique of repairing and strengthening reinforcing bar concrete structures such as tunnel, bridge, and common duct using lattice-type fiber mesh and cementitious matrix as reinforcement materials to improve load carrying capacity and fire resistance"
(Patent Document 0003) Korean Patent Registration No. 10-1434523 (Date of Registration: Aug. 20, 2014), Title of Invention: "Technique of repairing and seismically retrofitting concrete structure using inorganic cementitious matrix and coated fiber grid"
(Patent Document 0004) Korean Patent Registration No. 10-1169770 (Date of Registration: Jul. 24, 2012), Title of Invention: "Concrete structure using release steel wire net and technique of strengthening the same"
(Patent Document 0005) Korean Patent Registration No. 10-1994852 (Date of Registration: Jun. 25, 2019), Title of Invention: "Concrete structure using reinforcing panel having embedded lattice reinforcement material and method of repairing and strengthening the same"
(Patent Document 0006) Korean Patent Registration No. 10-2003670 (Date of Registration: Jul. 19, 2019), Title of Invention: "Textile grid reinforced concrete structure using textile grid fixing device and construction method thereof"

SUMMARY OF THE INVENTION

The present disclosure is directed to providing a concrete structure strengthened using a grid reinforcement material and non-shrink grout and a method of strengthening the same in which, when strengthening a concrete structure such as a concrete slab or a concrete wall body that is damaged or deteriorated, a grid reinforcement material is mounted on one side of the concrete structure, a formwork is formed on an outer side of the grid reinforcement material to have a required gap, and then the gap is filled with non-shrink grout so that the non-shrink grout is cured therein to strengthen the old concrete structure, thereby being able to automatically fill and repair cracks formed in the concrete structure just by injecting the non-shrink grout without separately performing crack repair on the old concrete structure.

The present disclosure is also directed to providing a concrete structure strengthened using a grid reinforcement material and non-shrink grout and a method of strengthening the same capable of easily fixing or mounting the grid reinforcement material using a grid fixing device and capable of being easily applied to strengthening of a concrete structure having a curved surface as well as a concrete structure having a flat surface such as a concrete slab or a concrete wall body.

The present disclosure is also directed to providing a concrete structure strengthened using a grid reinforcement material and non-shrink grout and a method of strengthening the same in which reinforcing bars are additionally arranged in a gap between a surface of the concrete structure and the grid reinforcement material so that the grid reinforcement material increases a cover thickness, and thus the concrete structure is remarkably strengthened and corrosion of the reinforcing bars is prevented.

The present disclosure provides a concrete structure strengthened using a grid reinforcement material and non-shrink grout, which is an old concrete structure that is damaged or deteriorated, the concrete structure including: a structure to be strengthened of which one side is filled with a grid reinforcement material and non-shrink grout to be strengthened; a grid reinforcement material, which is a lattice-type textile grid, installed to be spaced apart at predetermined intervals on the structure to be strengthened; a grid fixing device which includes a first retainer and a second retainer and allows the grid reinforcement material to be inserted and fixed between the first retainer and the second retainer so that the grid reinforcement material is mounted on or fixed to the structure to be strengthened; and non-shrink grout injected and filled through a formwork installed to be spaced apart from the grid reinforcement material, wherein a crack in the structure to be strengthened is automatically filled with the non-shrink grout to strengthen the structure to be strengthened.

Here, the grid reinforcement material may be a carbon fiber textile grid made of an incombustible material to improve the fire resistance of the structure to be strengthened.

Here, the structure to be strengthened may be an old concrete slab or an old concrete wall body that is damaged or deteriorated.

Here, when the structure to be strengthened is a concrete slab, the grid fixing device may include a first retainer which has a first through-hole formed in a central portion and which comes in direct contact with the lattice-type grid reinforcement material so that the grid reinforcement material is fixed, a cylindrical spacer which has a second through-hole corresponding to the first through-hole formed therein and which is integrally formed with a lower surface of the first retainer so that the first retainer maintains a predetermined distance from the structure to be strengthened, an anchor pin which is tacked using a tacker or tacking device and which passes through the first through-hole and the second through-hole to be tacked into the structure to be strengthened, and a second retainer which is formed to be stacked on the first retainer, has a through-hole formed in a central portion, and comes in direct contact with the grid reinforcement material.

Here, when the structure to be strengthened is a concrete wall body, the grid fixing device may include the first retainer which has a first through-hole formed in a central portion and which comes in direct contact with the lattice-type grid reinforcement material so that the grid reinforcement material is fixed, a spacing pin which passes through the first through-hole of the first retainer to maintain a distance between the structure to be strengthened and a wall body side surface formwork, and the second retainer which is formed to be stacked on the first retainer, has a through-hole formed in a central portion, and comes in direct contact with the grid reinforcement material.

Here, the non-shrink grout may be non-shrink mortar formed by mixing 100 parts by weight of cement, 25 to 35 parts by weight of fine blast-furnace slag powder, 2 to 3 parts by weight of silica fume, 140 to 150 parts by weight of fine aggregate, 40 to 50 parts by weight of water, 1.5 to 2.5 parts by weight of a high-performance water reducing agent, and 1.2 to 2 parts by weight of a polymer expansion material.

Here, reinforcing bars may be additionally arranged between the structure to be strengthened and the grid reinforcement material, and the grid reinforcement material may serve to increase a cover thickness to prevent corrosion of the reinforcing bars.

The present disclosure also provides a method of strengthening a concrete structure using a grid reinforcement material and non-shrink grout, the method including: a) cleaning a surface of a structure to be strengthened that is damaged or deteriorated; b) fixing a grid fixing device including a first retainer, a spacer, and an anchor pin to the structure to be strengthened; c) mounting the grid reinforcement material on the first retainer of the grid fixing device; d) fastening a second retainer of the grid fixing device so that the anchor pin passes therethrough to fix the grid reinforcement material; e) installing an air vent and a slab side end portion formwork on each side end portion of the structure to be strengthened; f) installing a slab lower portion formwork on the slab side end portion formwork and installing at least one or more grout injection holes in the slab lower portion formwork; g) injecting and filling non-shrink grout through the grout injection hole and allowing the non-shrink grout to cure; and h) when curing of the non-shrink grout is completed, removing the slab lower portion formwork and the slab side end portion formwork to finish strengthening of the structure to be strengthened, wherein a crack in the structure to be strengthened is automatically filled with the non-shrink grout to strengthen the structure to be strengthened.

Here, the structure to be strengthened may be an old concrete slab that is damaged or deteriorated, and a lower portion of the slab may be strengthened.

Here, in step g), the non-shrink grout injected through the grout injection hole may be injected and filled while air discharge is controlled through the air vent.

Meanwhile, the present disclosure also provides a method of strengthening a concrete structure using a grid reinforcement material and non-shrink grout, the method including: a) cleaning a surface of a structure to be strengthened that is damaged or deteriorated; b) mounting a grid fixing device including a first retainer and a spacing pin on a side surface of a wall body, which is the structure to be strengthened; c) mounting a grid reinforcement material on a side surface of the first retainer of the grid fixing device; d) fastening a second retainer of the grid fixing device so that the spacing pin passes therethrough to fix the grid reinforcement material; e) installing an air vent on an upper end portion of the structure to be strengthened and installing a wall body end portion formwork on each of an upper end portion and a lower end portion of the structure to be strengthened; f) installing a wall body side surface formwork on a side surface of the wall body end portion formwork and installing at least one or more grout injection holes in the wall body side surface formwork; g) injecting and filling non-shrink grout through the grout injection hole and allowing the non-shrink grout to cure; and h) when curing of the non-shrink grout is completed, removing the wall body side surface formwork and the wall body end portion formwork to finish strengthening of the structure to be strengthened, wherein a crack in the structure to be strengthened is automatically filled with the non-shrink grout to strengthen the structure to be strengthened.

Here, the structure to be strengthened may be an old concrete wall body that is damaged or deteriorated, and a side surface of the wall body may be strengthened.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 5A to 5C are views illustrating various types of retainers of the grid fixing device in the concrete structure strengthened using a grid reinforcement material and a non-shrink grout according to an embodiment of the present disclosure;

FIG. 13A to 13C are views illustrating the strengthening of a wall body in the method of strengthening a concrete structure using a grid reinforcement material and a non-shrink grout according to the second embodiment of the present disclosure in detail;

DETAILED DESCRIPTION OF EXEMPLARY EMBODIMENTS

Figure 1A:
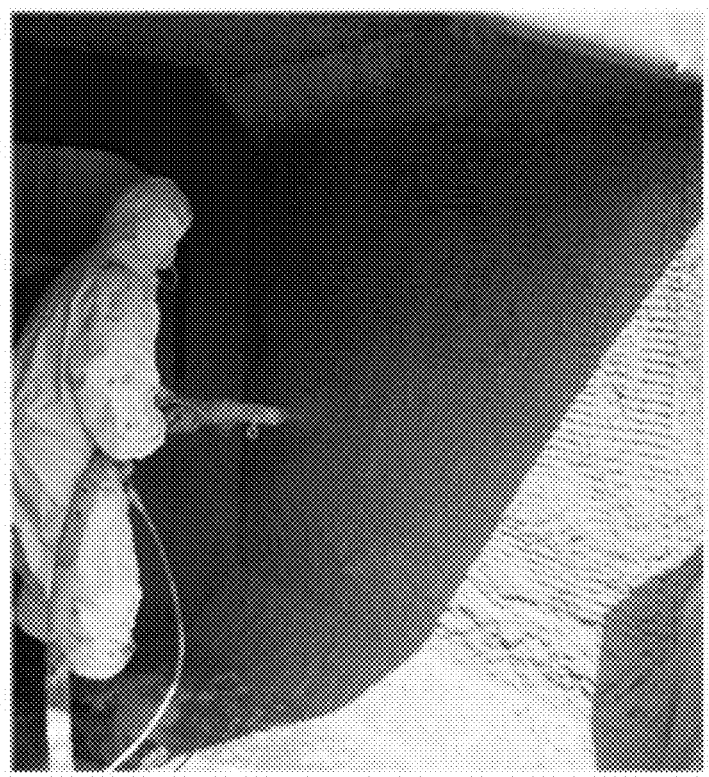
FIGS. 1A and 1B are views for describing a method of strengthening a concrete structure using a grid reinforcement material and mortar spraying according to the related art.
Figure 1B:
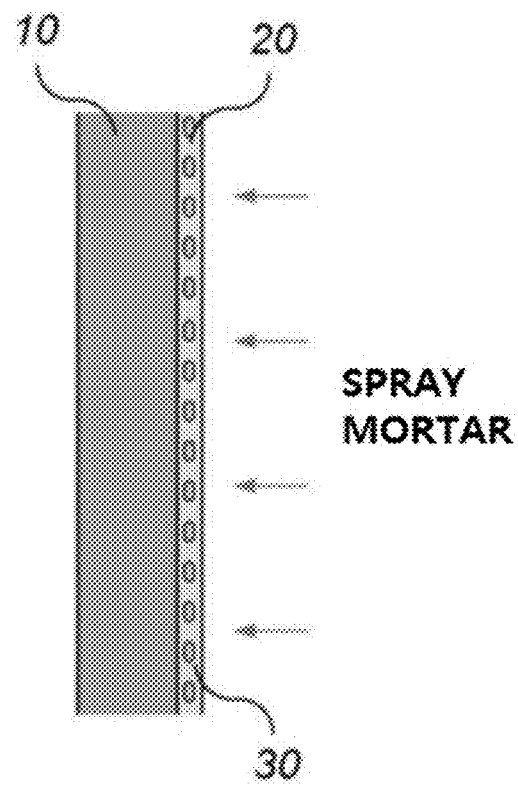

Hereinafter, embodiments of the present disclosure will be described in detail with reference to the accompanying drawings to allow those of ordinary skill in the art to which the present disclosure pertains to easily practice the present disclosure. However, the present disclosure may be implemented in various different forms and is not limited by the embodiments described herein. Also, in order to clearly describe the present disclosure, parts unrelated to the description have been omitted from the drawings, and similar parts will be denoted by like reference numerals throughout the specification.

Throughout the specification, when a certain part is described as "including" a certain element, this indicates that the certain part may further include another element instead of excluding another element unless the context clearly indicates otherwise.

[Concrete Structure Strengthened Using Grid Reinforcement Material and Non-Shrink Grout]

Figure 3:
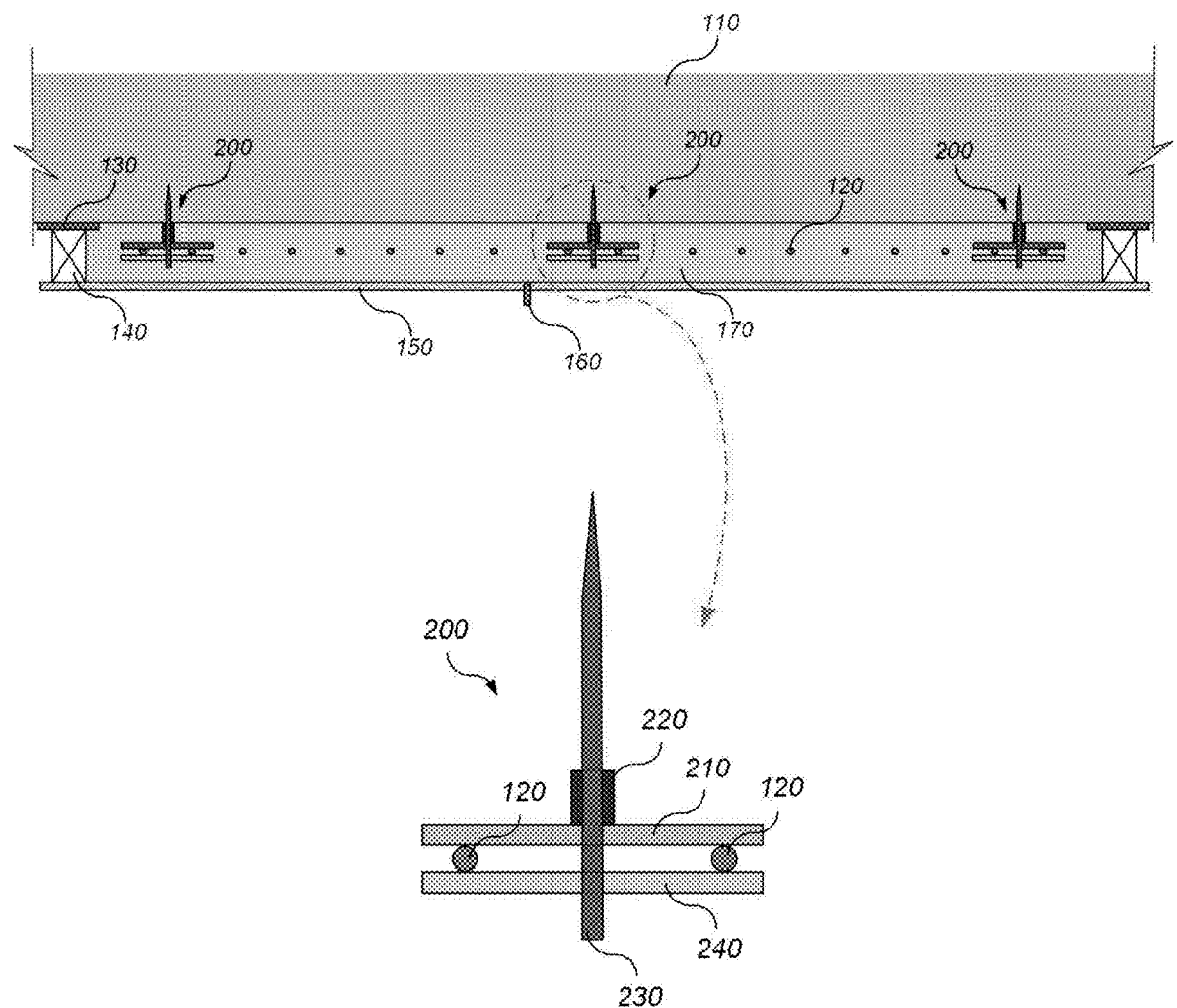
FIG. 3 is a view illustrating a concrete structure strengthened using a grid reinforcement material and non-shrink grout according to an embodiment of the present disclosure.

FIG. 3 is a view illustrating a concrete structure strengthened using a grid reinforcement material and non-shrink grout according to an embodiment of the present disclosure.

Referring to FIG. 3, the concrete structure strengthened using a grid reinforcement material and a non-shrink grout according to the embodiment of the present disclosure includes a structure to be strengthened 110, a grid reinforcement material 120, a grid fixing device 200, and a non-shrink grout 170.

The structure to be strengthened 110 is an old concrete structure that is damaged or deteriorated, and one side thereof is filled with the grid reinforcement material 120 and the non-shrink grout 170 to be strengthened. For example, the structure to be strengthened 110 may be a concrete slab or a concrete wall body, but is not limited thereto.

The grid reinforcement material 120, which is a lattice-type textile grid, is installed to be spaced apart at predetermined intervals on the structure to be strengthened 110. The grid reinforcement material 120 may be a carbon fiber textile grid made of an incombustible material to improve the fire resistance of the structure to be strengthened 110, but is not limited thereto.

The grid fixing device 200 includes a first retainer 210 and a second retainer 240 and allows the grid reinforcement material 120 to be inserted and fixed between the first retainer 210 and the second retainer 240 so that the grid reinforcement material 120 is mounted on or fixed to the structure to be strengthened 110. Here, when the grid fixing device 200 is used, the grid reinforcement material 120 may be easily fixed or mounted and may be easily applied to strengthening of a concrete structure having a curved surface as well as a concrete structure having a flat surface such as a concrete slab or a concrete wall body.

Specifically, here, when the structure to be strengthened 110 is a concrete slab, the grid fixing device 200 includes the first retainer 210 which has a first through-hole h1 formed in a central portion and which comes in direct contact with the lattice-type grid reinforcement material 120 so that the grid reinforcement material 120 is fixed, a cylindrical spacer 220 which has a second through-hole h2 corresponding to the first through-hole h1 formed therein and which is integrally formed with a lower surface of the first retainer 210 so that the first retainer 210 maintains a predetermined distance from the structure to be strengthened 110, an anchor pin 230 which is tacked using a tacker or tacking device 400 and which passes through the first through-hole h1 and the second through-hole h2 to be tacked into the structure to be strengthened 110, and the second retainer 240 which is formed to be stacked on the first retainer 210, has a through-hole formed in a central portion, and comes in direct contact with the grid reinforcement material 120.

Also, as illustrated in FIG. 13A to 13C which will be described below, when the structure to be strengthened 110 is a concrete wall body, a grid fixing device 200a may include the first retainer 210 which has the first through-hole h1 formed in the central portion and which comes in direct contact with the lattice-type grid reinforcement material 120 so that the grid reinforcement material 120 is fixed, a spacing pin 230a which passes through the first through-hole h1 of the first retainer 210 to maintain a distance between the structure to be strengthened 110 and a wall body side surface formwork 150a, and the second retainer 240 which is formed to be stacked on the first retainer 210, has a through-hole formed in the central portion, and comes in direct contact with the grid reinforcement material 120.

The non-shrink grout 170 is injected and filled through a formwork 150 installed to be spaced apart from the grid reinforcement material 120. Accordingly, a crack in the structure to be strengthened 110 is automatically filled with the non-shrink grout 170 to strengthen the structure to be strengthened 110. For example, the non-shrink grout 170 may be non-shrink mortar formed by mixing 100 parts by weight of cement, 25 to 35 parts by weight of fine blast-furnace slag powder, 2 to 3 parts by weight of silica fume, 140 to 150 parts by weight of fine aggregate, 40 to 50 parts by weight of water, 1.5 to 2.5 parts by weight of a high-performance water reducing agent, and 1.2 to 2 parts by weight of a polymer expansion material.

Figure 14A:
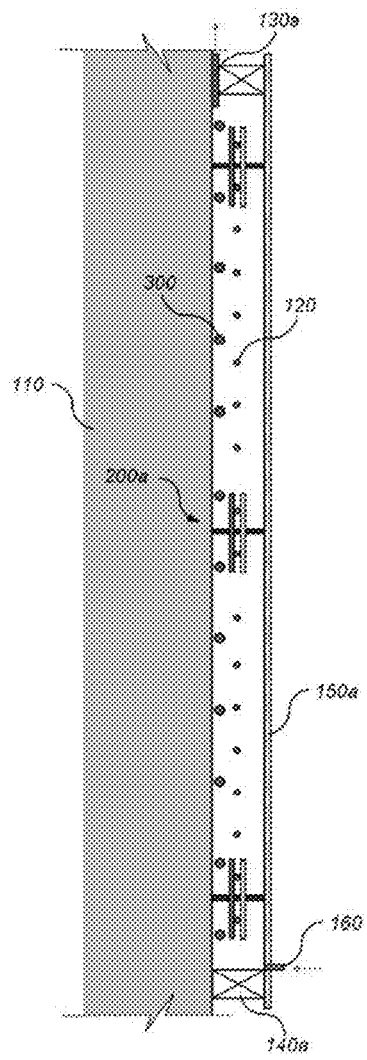
FIG. 14A to 14C are views illustrating the arranging of reinforcing bars to strengthen a wall body in the method of strengthening a concrete structure using a grid reinforcement material and a non-shrink grout according to the second embodiment of the present disclosure in detail.
Figure 14B:
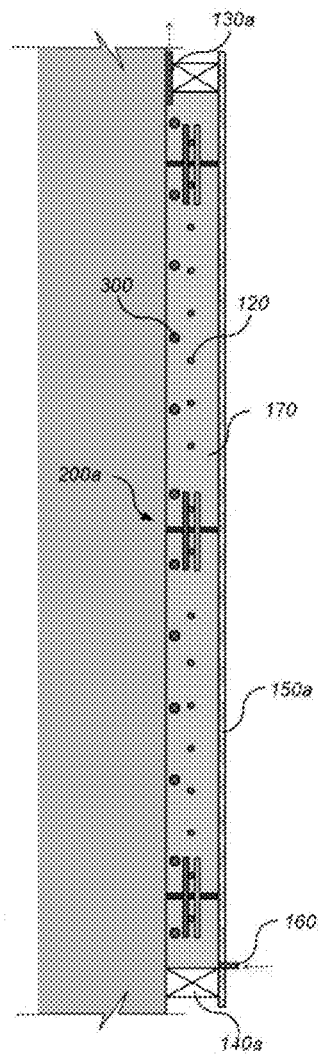
Figure 14C:
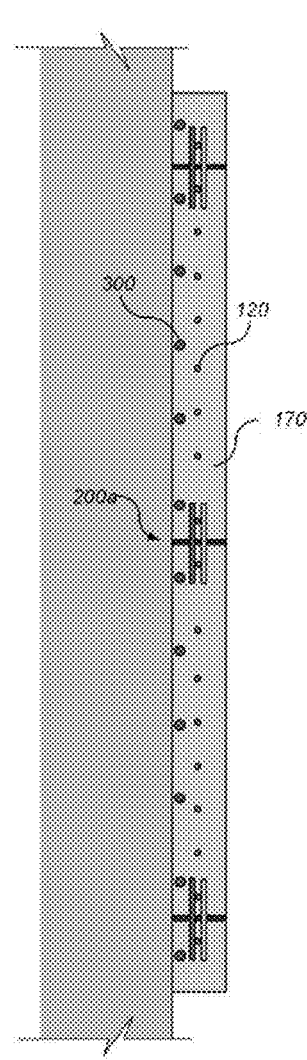

Also, as illustrated in FIG. 14A to 14C which will be described below, reinforcing bars 300 are additionally arranged between the structure to be strengthened 110 and the grid reinforcement material 120, and the grid reinforcement material 120 serves to increase a cover thickness to prevent corrosion of the reinforcing bars 300.

Figure 4A:
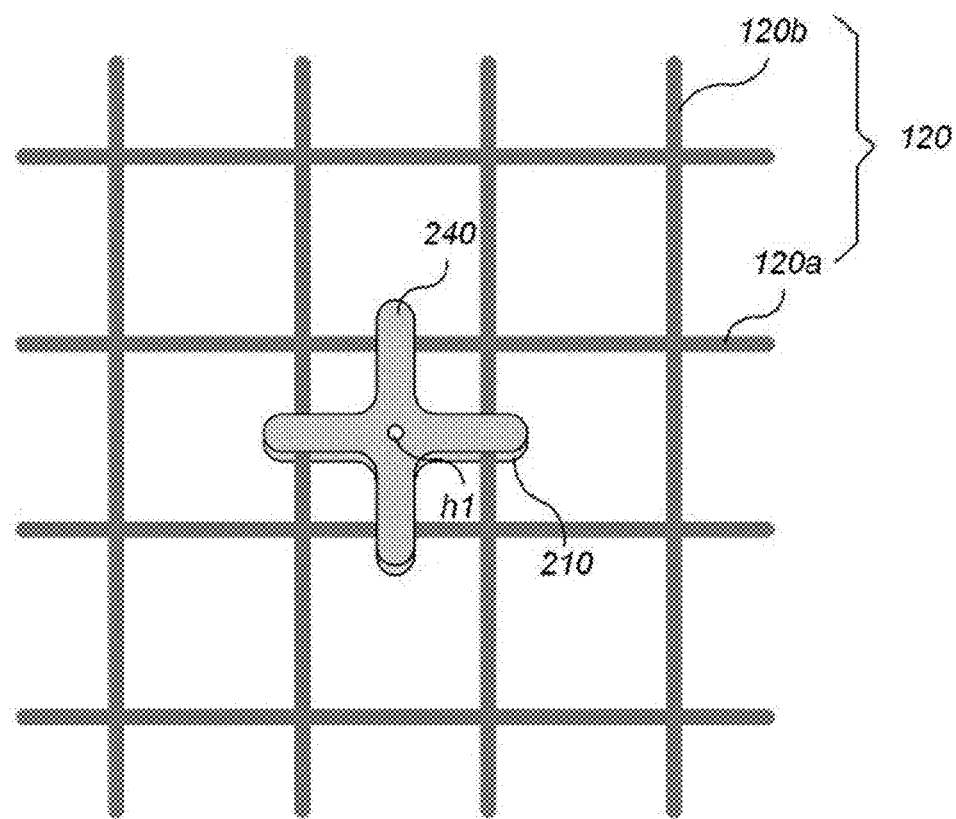
FIG. 4A to 4C are views illustrating a grid fixing device in the concrete structure strengthened using a grid reinforcement material and a non-shrink grout according to an embodiment of the present disclosure in detail.
Figures 4B, 4C:
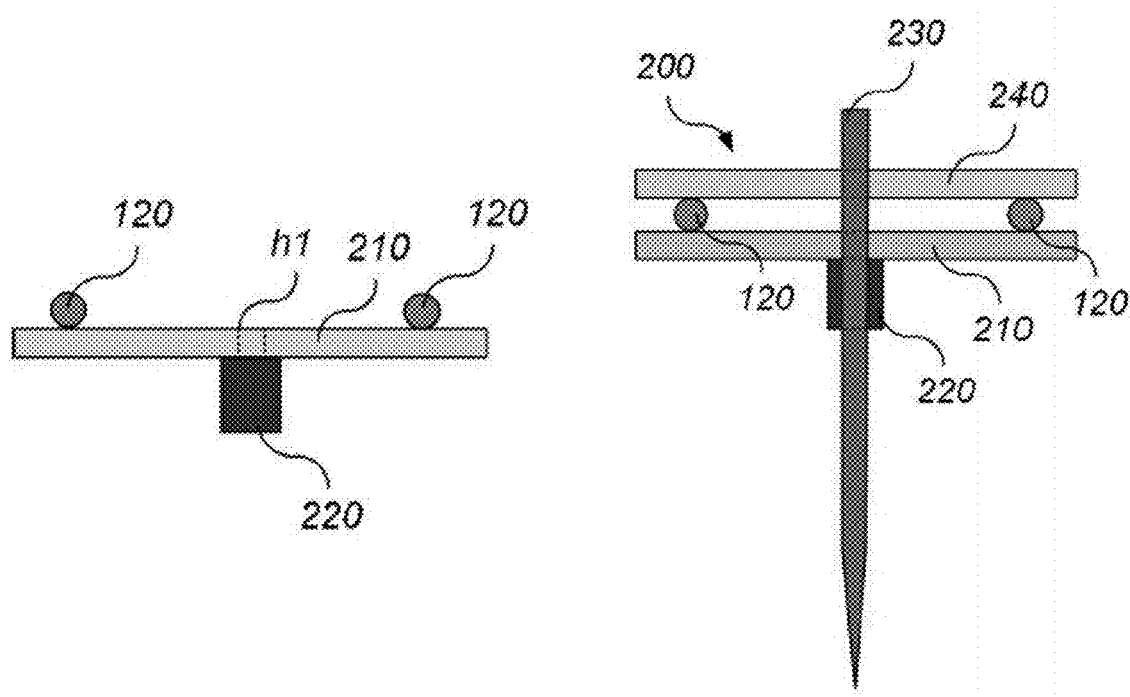

Meanwhile, FIG. 4A to 4C are views illustrating a grid fixing device in the concrete structure strengthened using a grid reinforcement material and a non-shrink grout according to the embodiment of the present disclosure in detail. FIG. 4A is a front view illustrating a state in which a retainer is mounted on the grid reinforcement material, FIG. 4B is a lateral view illustrating the state in which the retainer is mounted on the grid reinforcement material, and FIG. 4C is a view illustrating a grid fixing device into which an anchor pin is tacked.

As illustrated in FIGS. 4A to 4C, the grid fixing device 200 according to the embodiment of the present disclosure includes the first retainer 210, the spacer 220, the anchor pin 230, and the second retainer 240, and when the grid reinforcement material 120 is formed as multiple layers, a retainer may be additionally stacked.

The first retainer 210 has the first through-hole h1 formed in the central portion and comes in direct contact with the grid reinforcement material 120 so that the grid reinforcement material 120 is fixed. Here, the first retainer 210 may be formed in a cross shape, a linear shape, a quadrilateral shape, or a circular shape.

Figure 8:
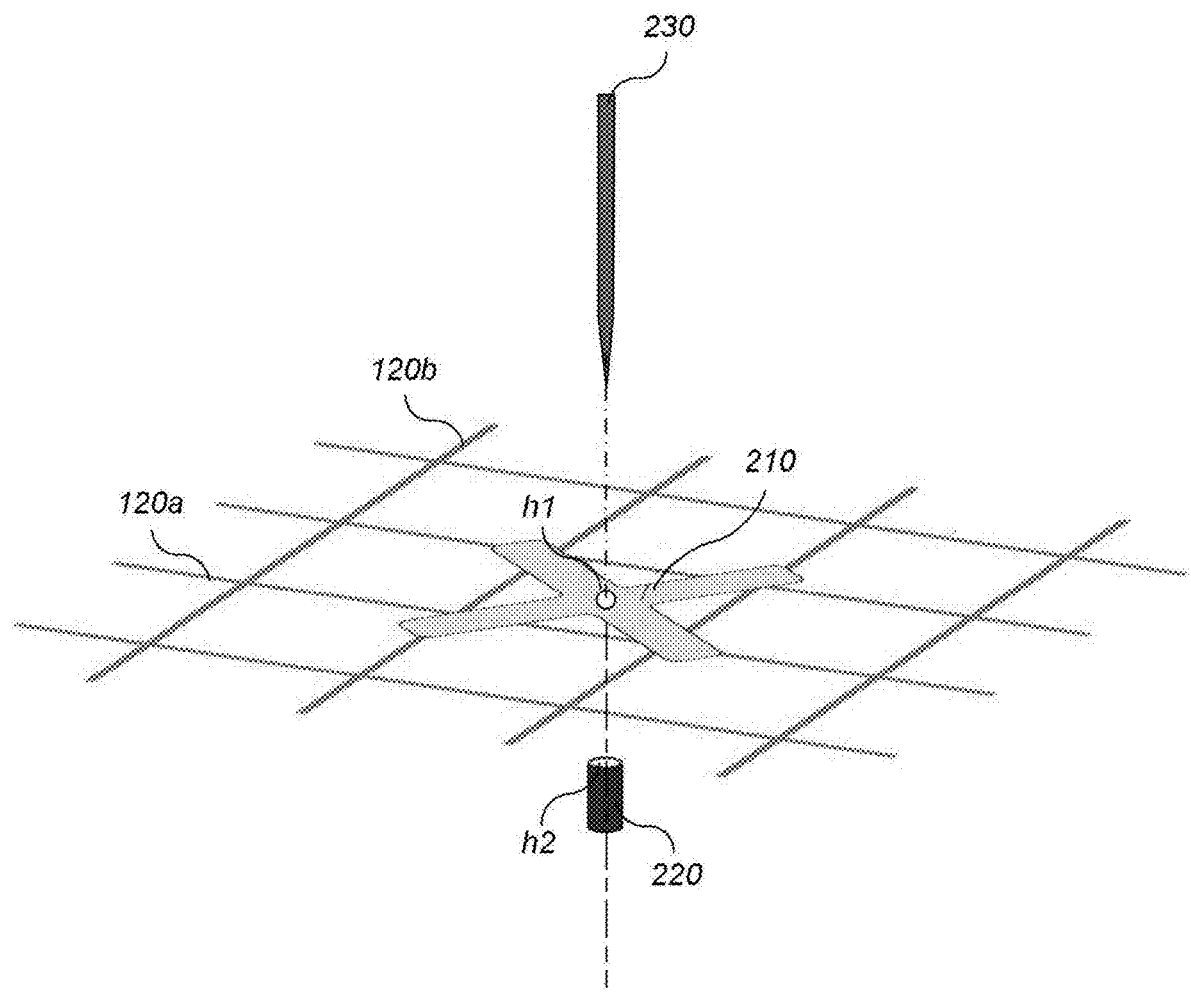
FIG. 8 is a view illustrating a state in which the anchor pin of the grid fixing device is installed to pass through a retainer and a spacer in the concrete structure strengthened using a grid reinforcement material and a non-shrink grout according to an embodiment of the present disclosure.

The spacer 220 is formed in a cylindrical shape and is integrally formed with a lower surface of the first retainer 210 so that the first retainer 210 maintains a predetermined distance from the structure to be strengthened 110. As illustrated in FIG. 8 which will be described below, the second through-hole h2 corresponding to the first through-hole h1 is formed in the spacer 220.

The anchor pin 230 passes through the first through-hole h1 formed in the first retainer 210 and the second through-hole h2 formed in the spacer 220 to be tacked into the structure to be strengthened 110. For example, the anchor pin 230 may be tacked into the structure to be strengthened 110 using an air tacker or tacking device. Also, as will be described below, when the structure to be strengthened 110 is a wall body, the grid fixing device 200a may be simply mounted using the spacing pin 230a without using the anchor pin 230.

The second retainer 240 comes in direct contact with the grid reinforcement material 120 so that the grid reinforcement material 120 is fixed, and the first through-hole h1 is formed in the central portion of the second retainer 240 so that the anchor pin 230 passes therethrough. Accordingly, the grid reinforcement material 120 is inserted and fixed between the first retainer 210 and the second retainer 240.

Meanwhile, FIG. 5A to 5C are views illustrating various types of retainers of the grid fixing device in the concrete structure strengthened using a grid reinforcement material and a non-shrink grout according to an embodiment of the present disclosure. FIG. 5A illustrates a cross-shaped retainer 210a, FIG. 5B illustrates a linear retainer 210b, and FIG. 5C illustrates a quadrilateral retainer 210c.

In the case of the grid fixing device 200 according to the embodiment of the present disclosure, as illustrated in FIG. 5, the shape of the retainer 210 is not limited and the retainer 210 may be manufactured in various shapes such as the cross shape illustrated in FIG. 5A, the linear shape illustrated in FIG. 5B, the quadrilateral shape illustrated in FIG. 5C, and a circular shape. Also, a material of the retainer 210 is not limited and the retainer 210 may be made of a noncorrosive metal, plastic, polypropylene, and the like.

Also, the retainer 210 serves to fix the grid reinforcement material 120, and preferably, a surface area of the retainer 210 may be minimized to allow the non-shrink grout 170, which is laid after installing the grid reinforcement material 120, and the grid reinforcement material 120 to be integrally formed. For example, in the case of the quadrilateral retainer 210c illustrated in FIG. 5C, a through-hole is formed in the central portion and a plurality of openings are formed to minimize the surface area of the quadrilateral retainer 210c, and a binder may be laid through the openings.

Figure 6A:
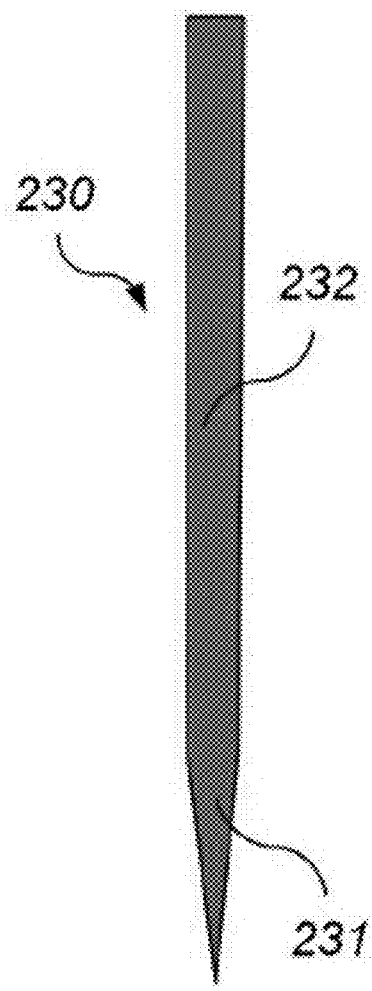
FIGS. 6A and 6B are views illustrating an anchor pin and a spacing pin of the grid fixing device in the concrete structure strengthened using a grid reinforcement material and a non-shrink grout according to an embodiment of the present disclosure.
Figure 6B:
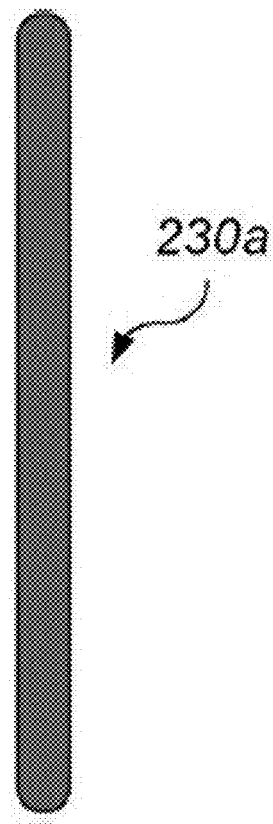
Figure 7:
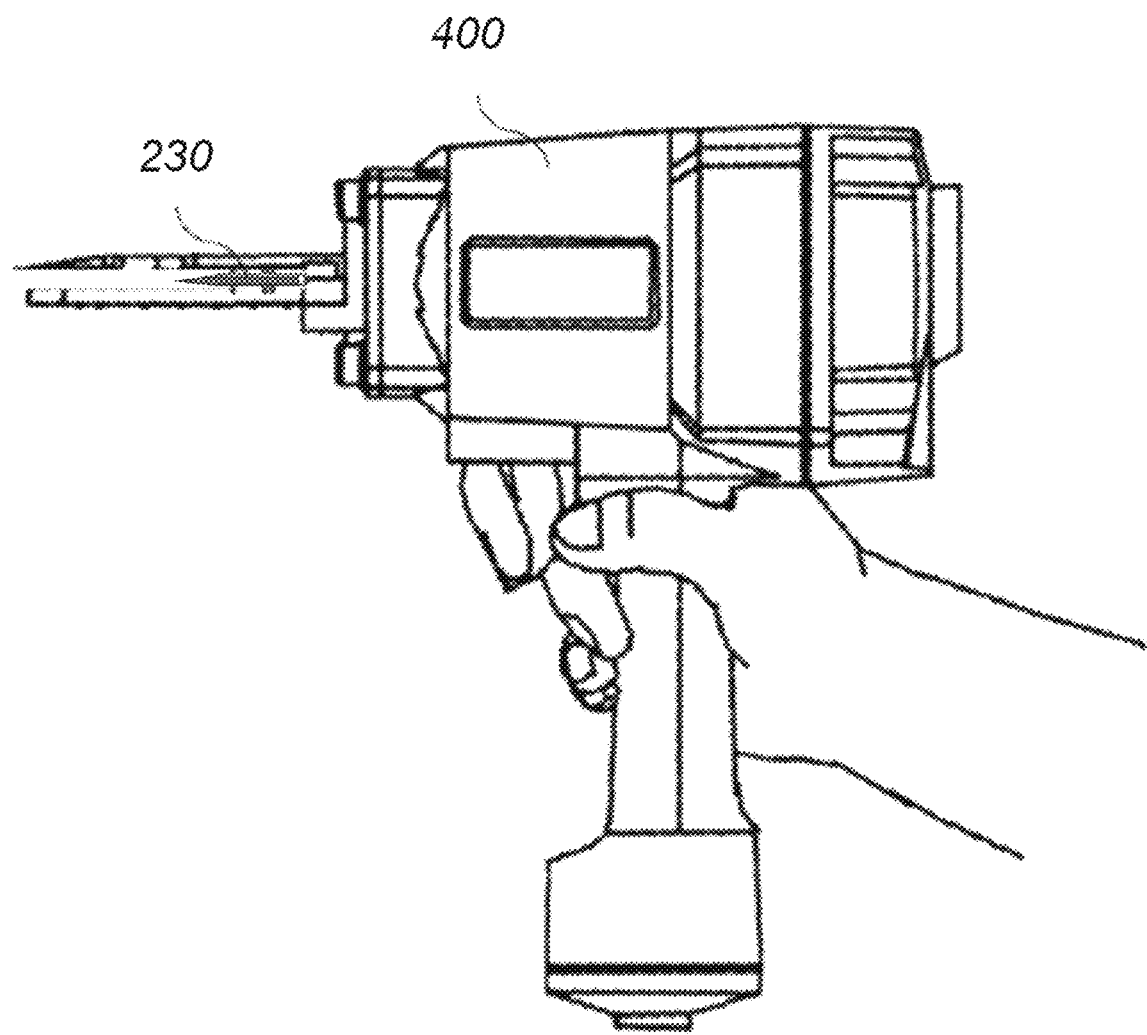
FIG. 7 is a view illustrating a tacking device for tacking the anchor pin of the grid fixing device in the concrete structure strengthened using a grid reinforcement material and a non-shrink grout according to an embodiment of the present disclosure.

Meanwhile, FIGS. 6A and 6B are views illustrating an anchor pin and a spacing pin of the grid fixing device in the concrete structure strengthened using a grid reinforcement material and a non-shrink grout according to an embodiment of the present disclosure, and FIG. 7 is a view illustrating a tacking device for tacking the anchor pin of the grid fixing device in the concrete structure strengthened using a grid reinforcement material and a non-shrink grout according to an embodiment of the present disclosure.

As illustrated in FIG. 6A, in the grid fixing device 200 according to the embodiment of the present disclosure, the anchor pin 230 includes a tip portion 231 and a body portion 232.

The tip portion 231 is sharply formed so that the anchor pin 230 is tacked into the structure to be strengthened 110.

The body portion 232 has one side connected to the tip portion 231 and the other side formed for being hit.

Here, the anchor pin 230 is preferably made of a noncorrosive steel material having a strength that allows the anchor pin 230 to be tacked into the structure to be strengthened 110, e.g., a concrete structure. The anchor pin 230 may be manufactured in the form of a nail. Here, the anchor pin 230 may be installed by impact-tacking, drilling, or the like, but in order to improve installation speed, the anchor pin 230 may be manufactured in the form of a power-actuated fastener (PAF), which uses compressed air or gunpowder, and installed to be fixed at a rapid speed to the structure to be strengthened 110. Also, as illustrated in FIG. 7, the anchor pin 230 may be manufactured as a magazine and loaded in the tacker or tacking device 400 to be continuously installed at a rapid speed.

Also, as illustrated in FIG. 6B, in the grid fixing device 200 according to the embodiment of the present disclosure, the spacing pin 230c may only consist of a body portion, and unlike the anchor pin 230, the spacing pin 230c may not include a tip portion tacked into the structure to be strengthened 110. That is, as will be described below, the spacing pin 230a serves to maintain a predetermined distance between the structure to be strengthened 110 and a formwork.

Meanwhile, FIG. 8 is a view illustrating a state in which the anchor pin of the grid fixing device is installed to pass through a retainer and a spacer in the concrete structure strengthened using a grid reinforcement material and a non-shrink grout according to an embodiment of the present disclosure.

In the case of the grid fixing device 200 according to the embodiment of the present disclosure, as illustrated in FIG. 8, the first retainer 210 and the spacer 220 are mounted on the grid reinforcement material 120, which is made of weft yarns 120a and warp yarns 120b, to fix the grid reinforcement material 120, and then the anchor pin 230 may be installed to pass through each of the first retainer 210 and the spacer 220 to be tacked into the structure to be strengthened 110. Then, the second retainer 240 is installed to be stacked on the first retainer 210 so that the grid reinforcement material 120 is inserted and fixed between the first retainer 210 and the second retainer 240.

Here, due to the spacer 220 of the grid fixing device 200, a constant distance may be maintained between the structure to be strengthened 110 and the grid reinforcement material 120. Here, intervals at which the grid reinforcement material 120 is disposed are determined according to the standards, type, and ductility of the carbon fiber textile grid. Preferably, the grid reinforcement material 120 is installed at maximum intervals of 50 cm in a horizontal direction. That is, in the concrete structure strengthened using a grid reinforcement material and a non-shrink grout according to the embodiment of the present disclosure, the carbon fiber textile grid made of an incombustible material may be used as the grid reinforcement material 120 to improve fire resistance.

Figure 9:
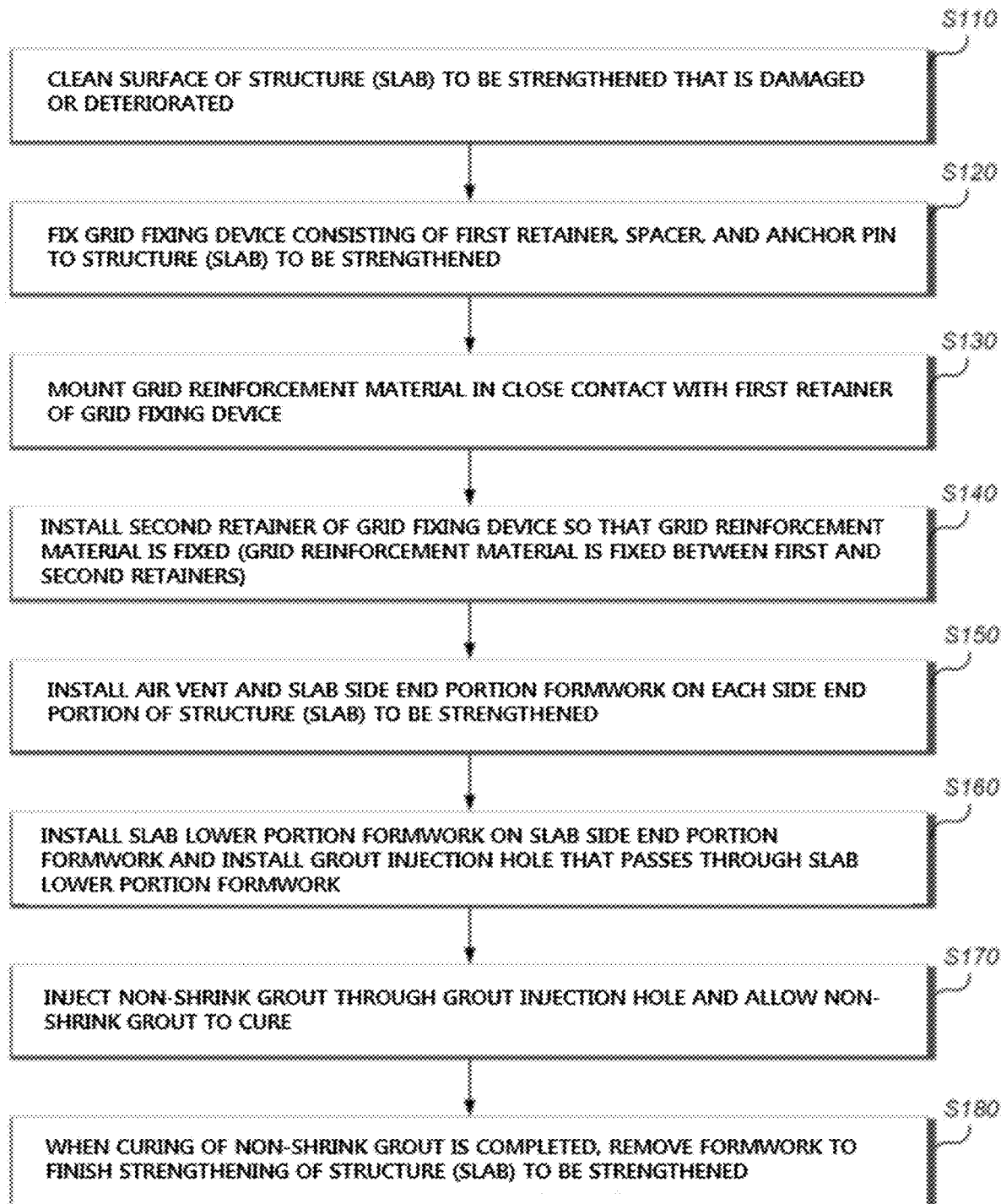
FIG. 9 is an operational flowchart of a method of strengthening a concrete structure using a grid reinforcement material and non-shrink grout according to a first embodiment of the present disclosure.

First Embodiment: Method of Strengthening Concrete Structure Using Grid Reinforcement Material and Non-Shrink Grout FIG. 9 is an operational flowchart of a method of strengthening a concrete structure using a grid reinforcement material and non-shrink grout according to a first embodiment of the present disclosure, and FIGS. 10A to 10H are views for describing the method of strengthening a concrete structure using a grid reinforcement material and a non-shrink grout according to the first embodiment of the present disclosure in detail.

Figure 10A:
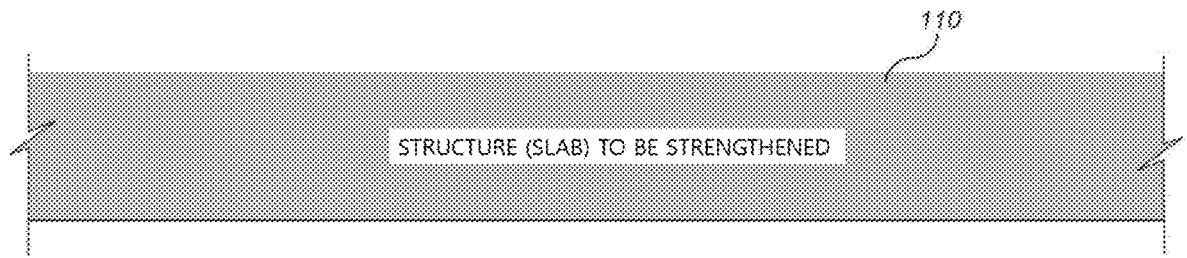
FIGS. 10A to 10H are views for describing the method of strengthening a concrete structure using a grid reinforcement material and a non-shrink grout according to the first embodiment of the present disclosure in detail.

Referring to FIG. 9 and FIGS. 10A to 10H, in the method of strengthening a concrete structure using a grid reinforcement material and a non-shrink grout according to the first embodiment of the present disclosure, first, as illustrated in FIG. 10A, a surface of a structure to be strengthened 110, e.g., a lower surface of a concrete slab, that is damaged or deteriorated is cleaned (S110). That is, the structure to be strengthened 110 is an old concrete slab that is damaged or deteriorated, and a lower portion of the slab is strengthened.

Figure 10B:
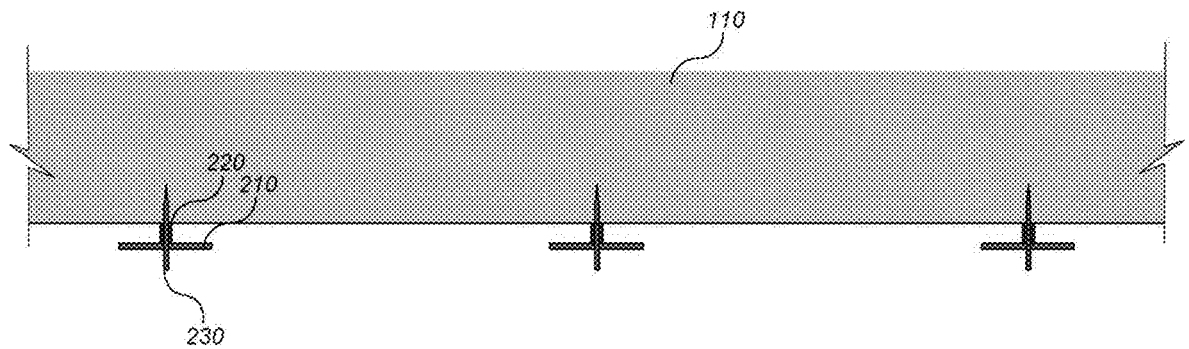

Next, as illustrated in FIG. 10B, a grid fixing device 200 including a first retainer 210, a spacer 220, and an anchor pin 230 is fixed to a lower surface of the slab, which is the structure to be strengthened 110 (S120). Here, the anchor pin 230 of the grid fixing device 200 is tacked and fixed to the lower portion of the slab, which is the structure to be strengthened 110, using an air tacker or tacking device 400.

Figure 10C:
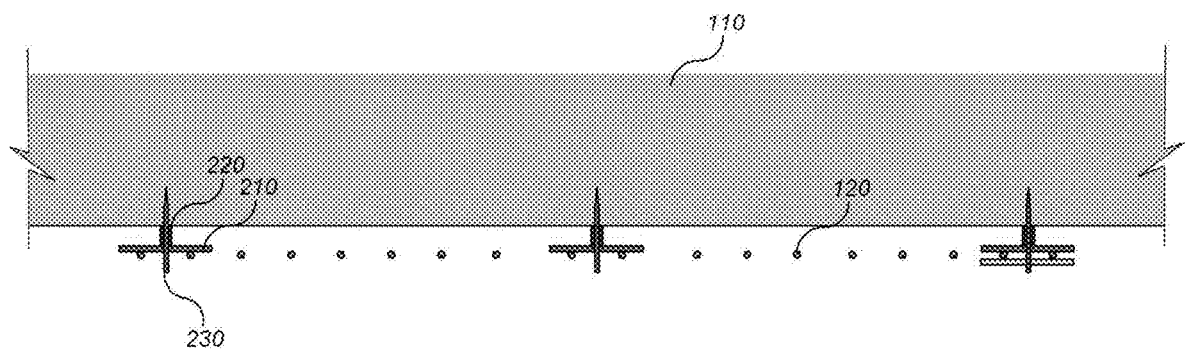

Next, as illustrated in FIG. 10C, a grid reinforcement material 120, e.g., a carbon fiber textile grid, is mounted on the first retainer 210 of the grid fixing device 200 (S130). Here, the grid reinforcement material 120 is preferably a carbon fiber textile grid made of an incombustible material to improve the fire resistance of the structure to be strengthened 110, but is not limited thereto.

Figure 10D:
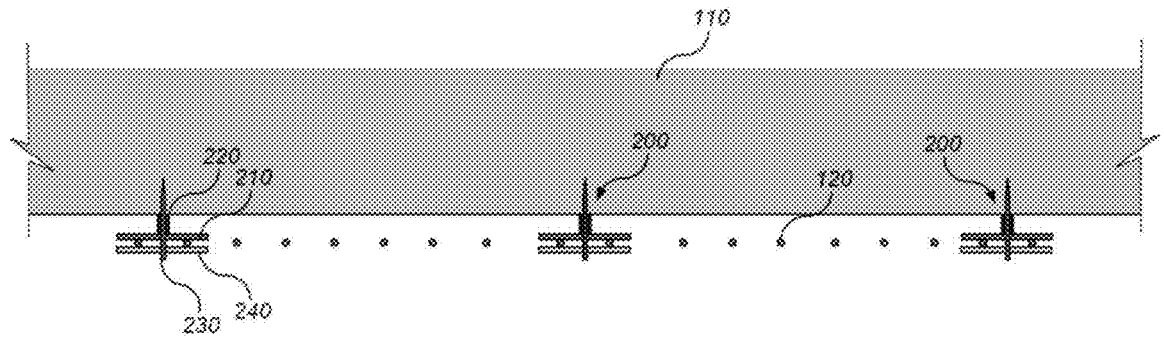

Next, as illustrated in FIG. 10D, a second retainer 240 of the grid fixing device 200 is fastened so that the anchor pin 230 passes therethrough to fix the grid reinforcement material 120 (S140). Here, the grid reinforcement material 120 is inserted and fixed between the first retainer 210 and the second retainer 240.

Specifically, the grid fixing device 200 includes the first retainer 210 which has a first through-hole h1 formed in a central portion and which comes in direct contact with the lattice-type grid reinforcement material 120 so that the grid reinforcement material 120 is fixed, a cylindrical spacer 220 which has a second through-hole h2 corresponding to the first through-hole h1 formed therein and which is integrally formed with a lower surface of the first retainer 210 so that the first retainer 210 maintains a predetermined distance from the structure to be strengthened 110, the anchor pin 230 which is tacked using the tacker or tacking device 400 and passes through the first through-hole h1 and the second through-hole h2 to be tacked into the structure to be strengthened 110, and the second retainer 240 which is formed to be stacked on the first retainer 210, has a through-hole formed in a central portion, and comes in direct contact with the grid reinforcement material 120, wherein the grid reinforcement material 120 is inserted and fixed between the first retainer 210 and the second retainer 240.

Figure 10E:
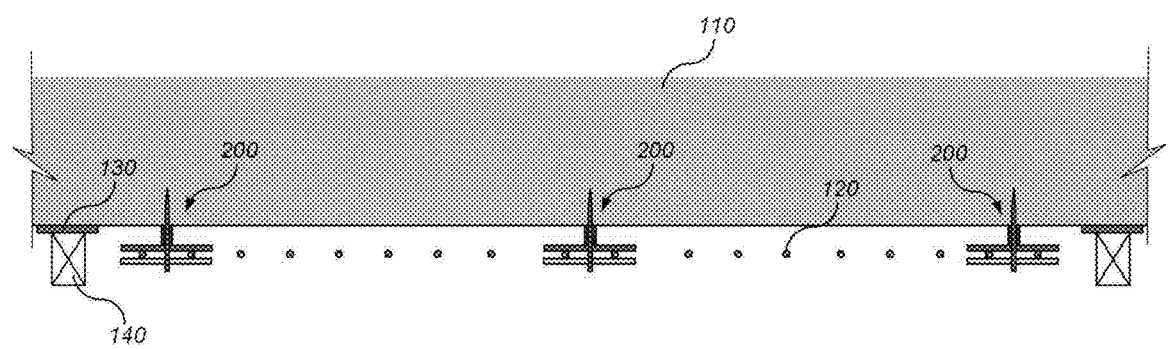

Next, as illustrated in FIG. 10E, an air vent 130 and a slab side end portion formwork 140 are installed at each side end portion of the structure to be strengthened 110 (S150). Here, the slab side end portion formwork 140 may be a balk but is not limited thereto.

Figure 10F:
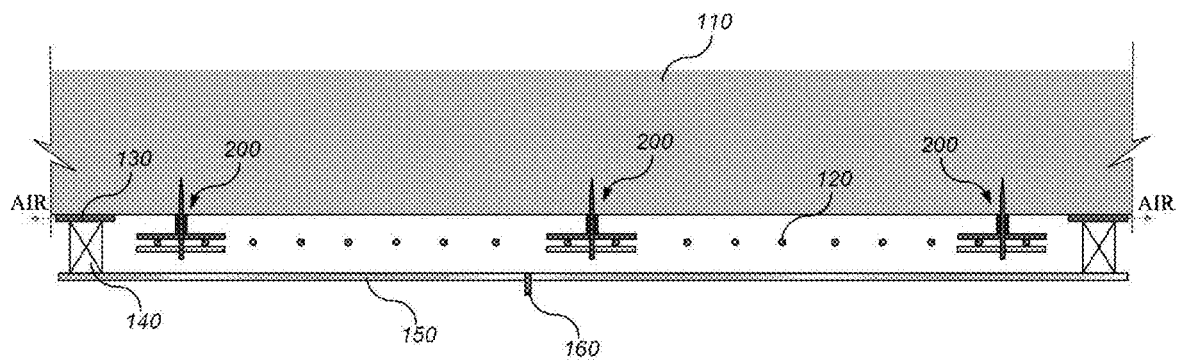

Next, as illustrated in FIG. 10F, a slab lower portion formwork 150 is installed on the slab side end portion formwork 140, and at least one or more grout injection holes 160 are installed in the slab lower portion formwork 150 (S160).

Figure 10G:
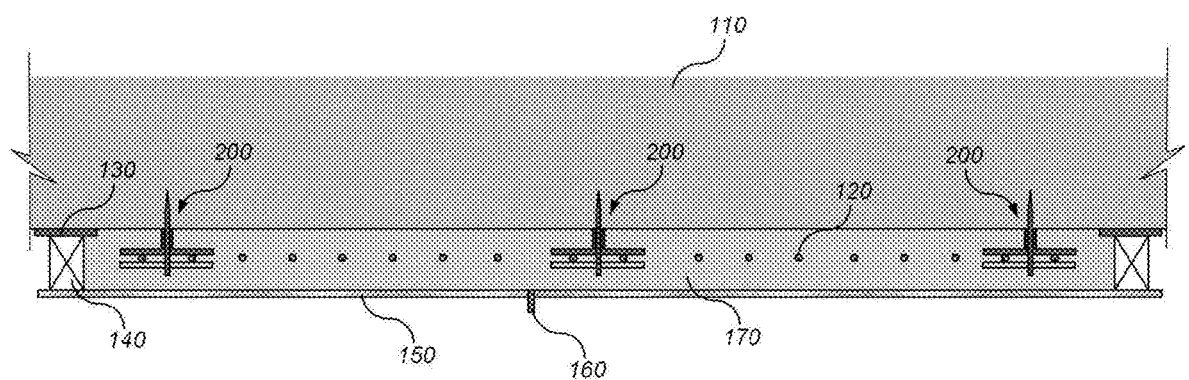

Next, as illustrated in FIG. 10G, non-shrink grout 170 is injected through the grout injection hole 160 and allowed to cure (S170). Here, the non-shrink grout 170 injected through the grout injection hole 160 may be cured while the air vent 130 is controlled and air is discharged.

Figure 10H:
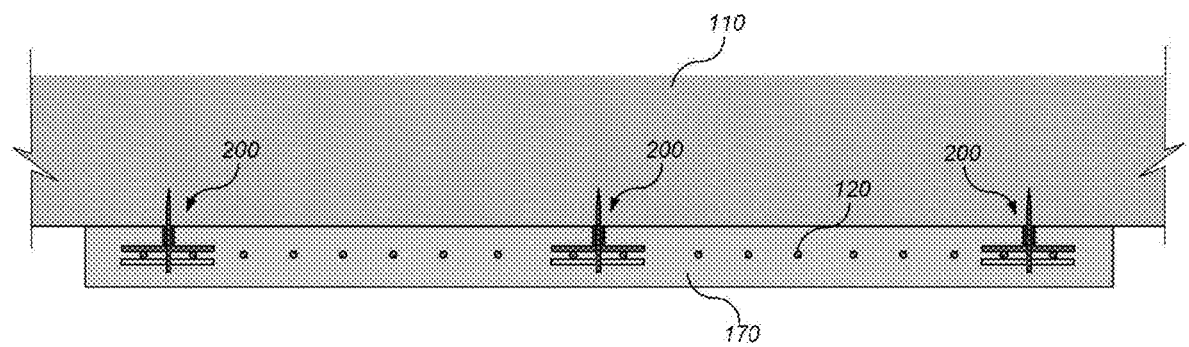

Next, as illustrated in FIG. 10H, when curing of the non-shrink grout 170 is completed, the slab lower portion formwork 150 and the slab side end portion formwork 140 are removed to finish strengthening of the slab, which is the structure to be strengthened 110 (S180).

Meanwhile, FIGS. 11A to 11F are views illustrating the fixing of the grid reinforcement material in the method of strengthening a concrete structure using a grid reinforcement material and a non-shrink grout according to the first embodiment of the present disclosure in detail.

Figure 11A:
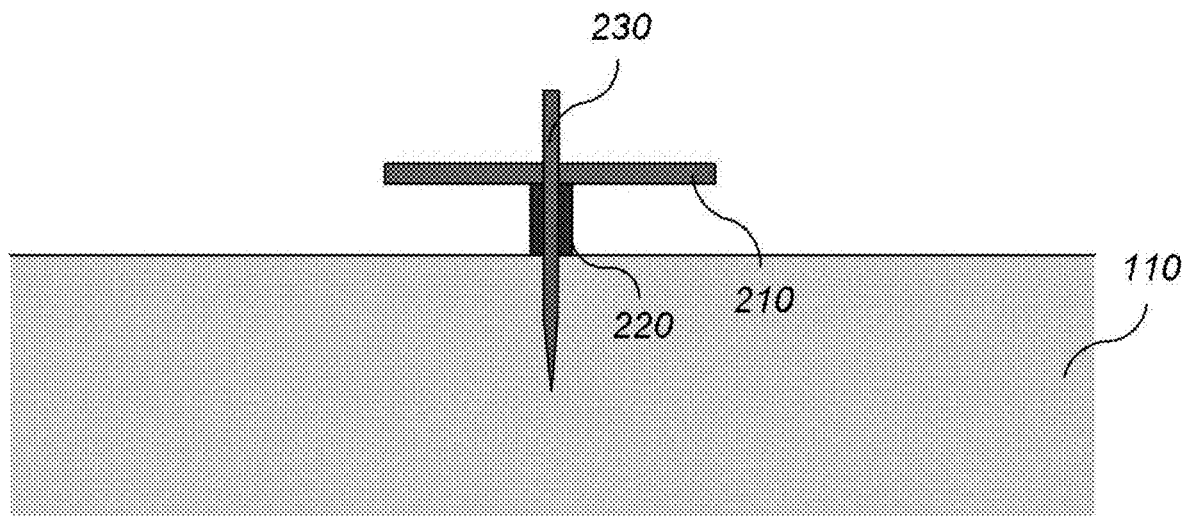
FIGS. 11A to 11F are views illustrating the fixing of the grid reinforcement material in the method of strengthening a concrete structure using a grid reinforcement material and a non-shrink grout according to the first embodiment of the present disclosure in detail.

In the method of strengthening the concrete structure using a grid reinforcement material and a non-shrink grout according to the first embodiment of the present disclosure, in a method of fixing the grid reinforcement material, first, as illustrated in FIG. 11A, the first retainer 210 integrally formed with the spacer 220 is mounted on the structure to be strengthened 110, and the anchor pin 230 is tacked and fixed to the structure to be strengthened 110 using the tacker or tacking device so that the anchor pin 230 passes through the through-holes formed in the first retainer 210 and the spacer 220.

Figure 11B:
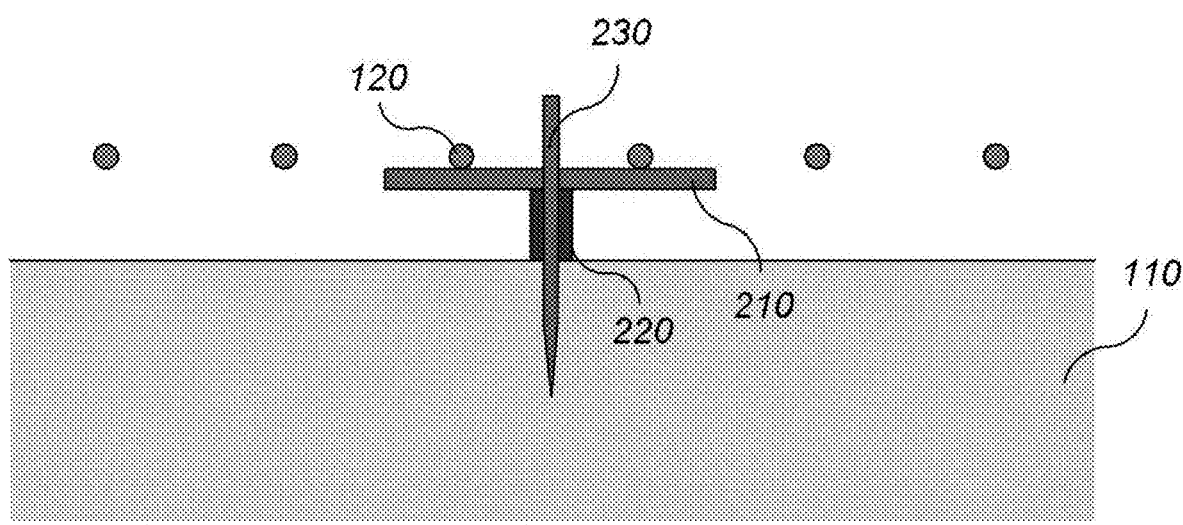

Next, as illustrated in FIG. 11B, the lattice-type grid reinforcement material 120 is mounted on the first retainer 210.

Figure 11C:
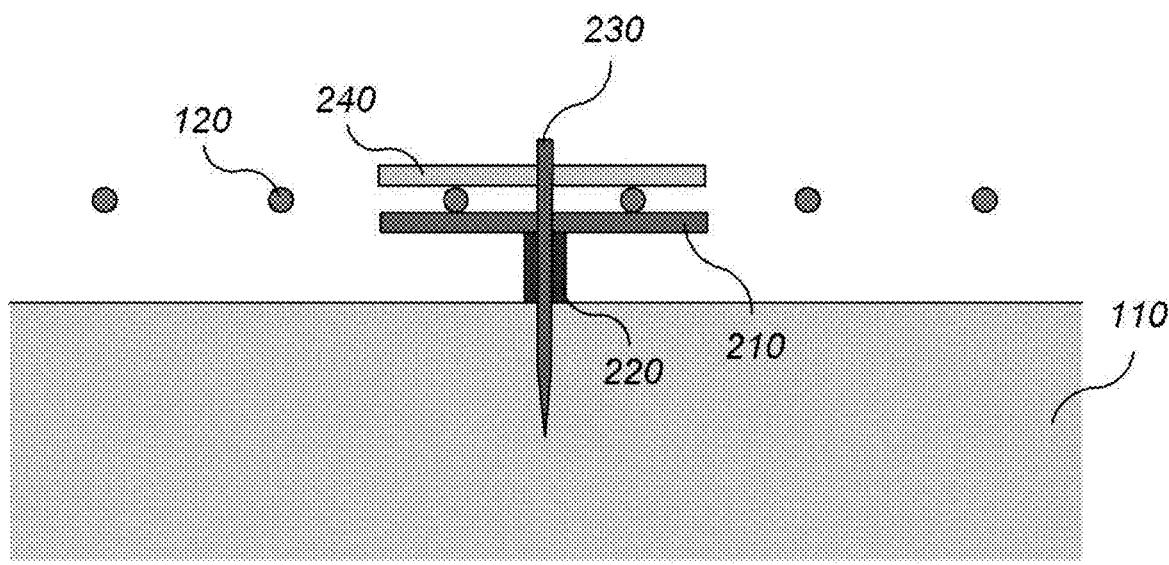

Next, as illustrated in FIG. 11C, the second retainer 240 is installed on the first retainer 210 on which the grid reinforcement material 120 is mounted, and accordingly, the grid reinforcement material 120 is inserted and fixed between the first retainer 210 and the second retainer 240.

Figure 11D:
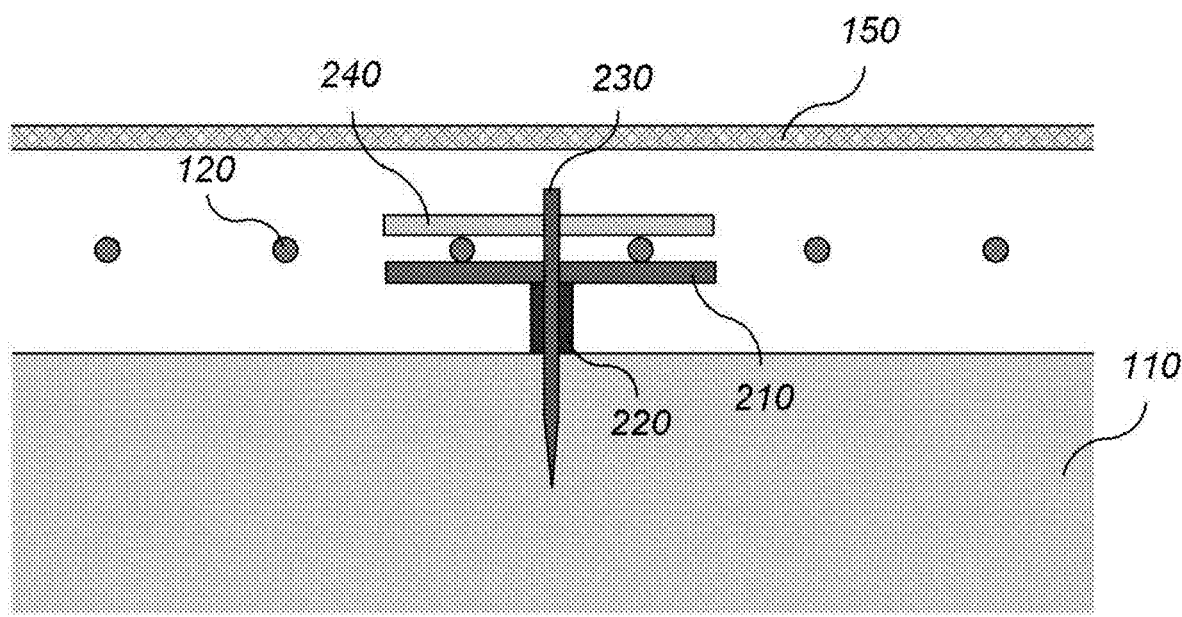

Next, as illustrated in FIG. 11D, the slab lower portion formwork 150 is installed to be spaced a predetermined distance apart from the grid reinforcement material 120. Here, the slab lower portion formwork 150 is illustrated as being installed a predetermined distance above the grid reinforcement material 120, but substantially, the slab lower portion formwork 150 is installed on the lower portion of the slab.

Figure 11E:
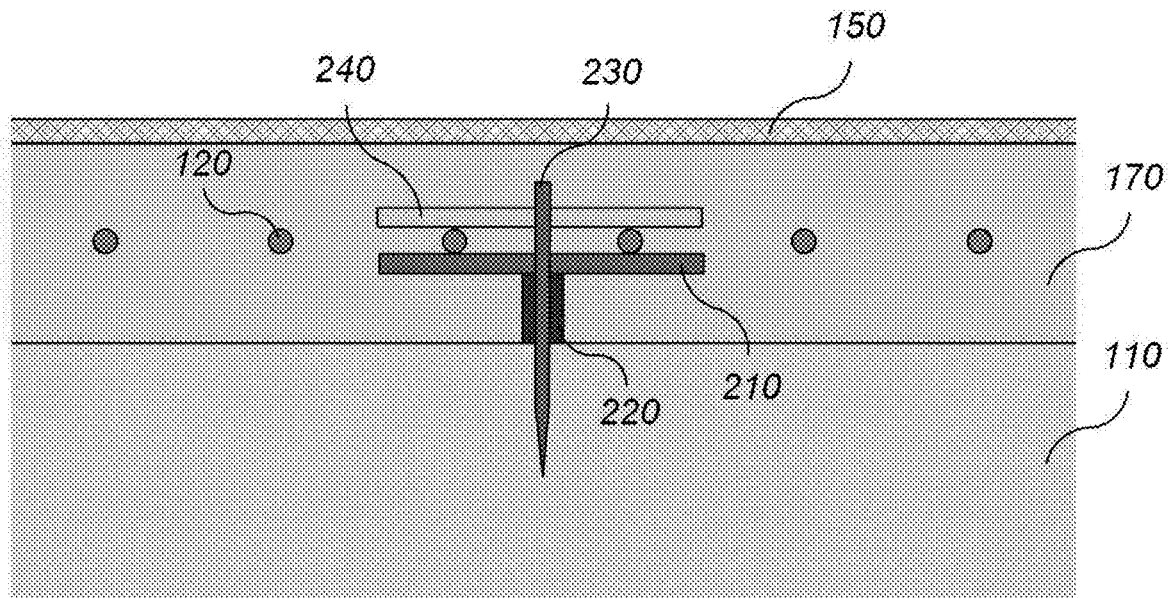

Next, as illustrated in FIG. 11E, the non-shrink grout 170 is injected and filled through the grout injection hole and allowed to cure.

Figure 11F:
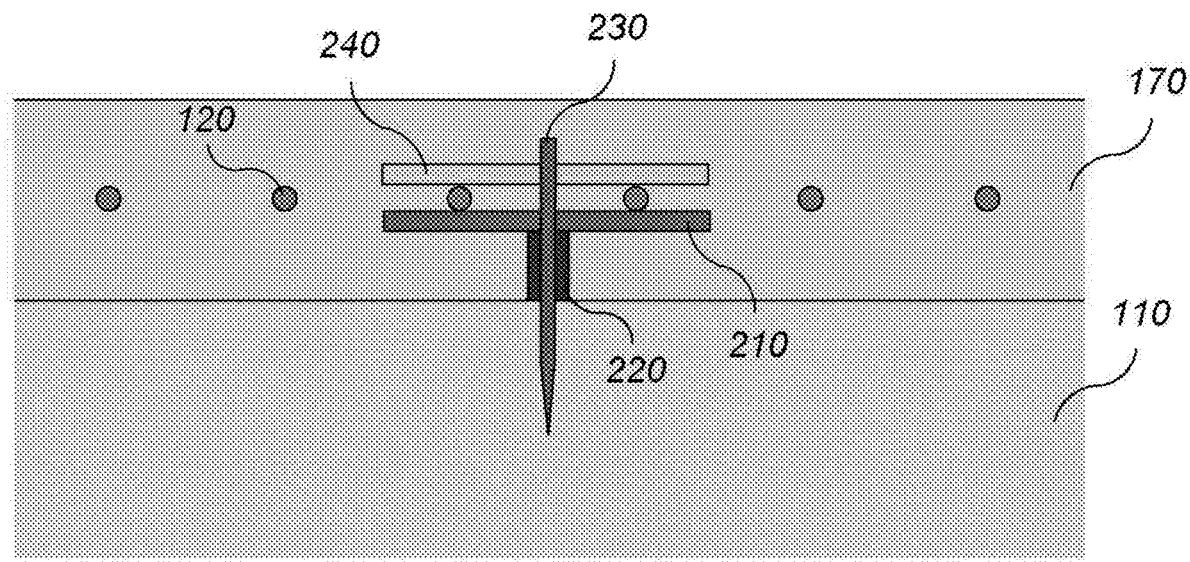

Next, as illustrated in FIG. 11F, when the curing of the non-shrink grout 170 is completed, the slab lower portion formwork 150 is removed to finish the strengthening of the slab, which is the structure to be strengthened 110. Accordingly, a crack in the structure to be strengthened 110 is automatically filled with the non-shrink grout 170 to strengthen the structure to be strengthened 110.

Figure 12:
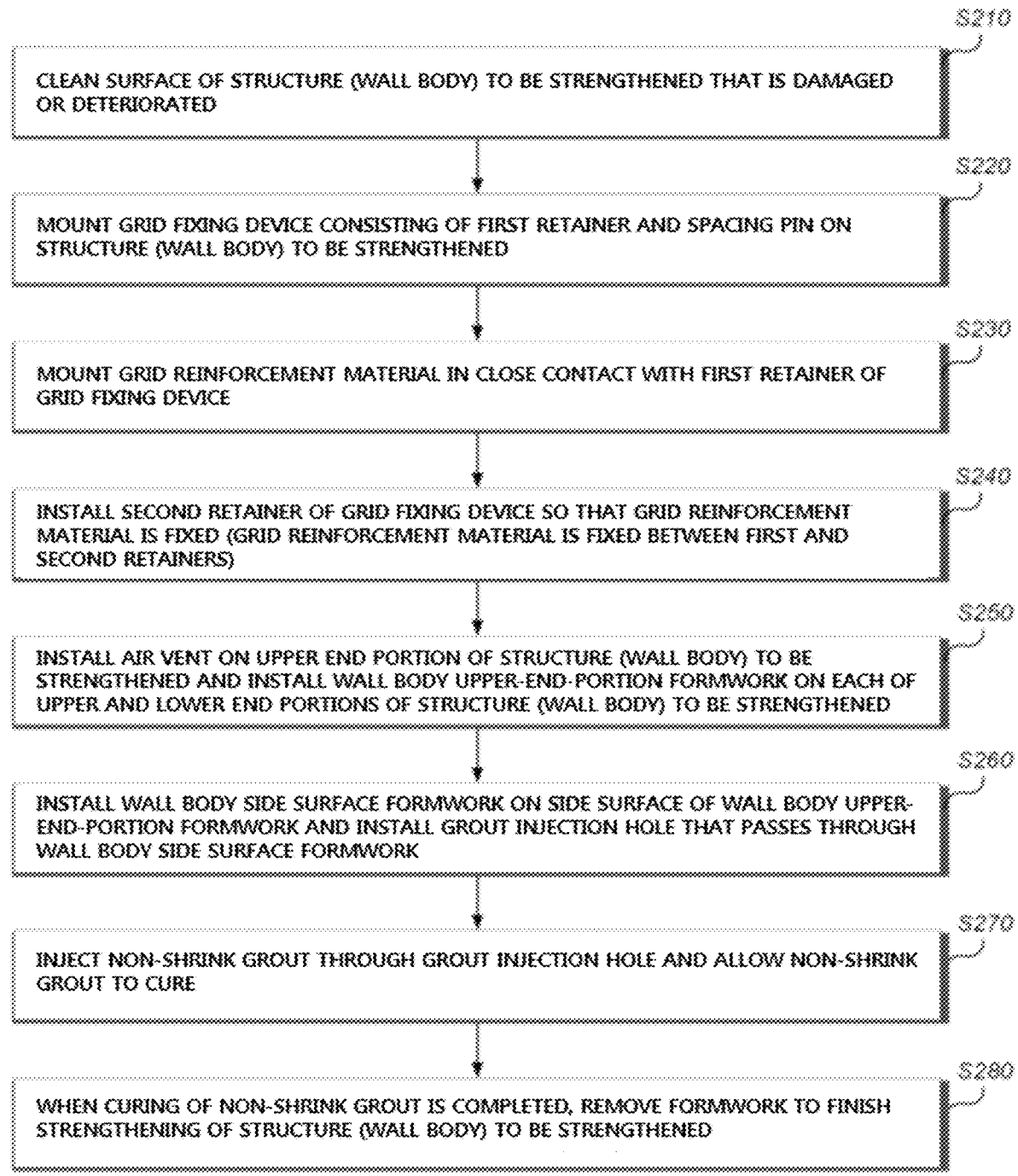
FIG. 12 is an operational flowchart of a method of strengthening a concrete structure using a grid reinforcement material and non-shrink grout according to a second embodiment of the present disclosure.

Second Embodiment: Method of Strengthening Concrete Structure Using Grid Reinforcement Material and Non-Shrink Grout FIG. 12 is an operational flowchart of a method of strengthening a concrete structure using a grid reinforcement material and non-shrink grout according to a second embodiment of the present disclosure, and FIG. 13A to 13C are views illustrating the strengthening of a wall body in the method of strengthening a concrete structure using a grid reinforcement material and a non-shrink grout according to the second embodiment of the present disclosure in detail.

Referring to FIGS. 12 and 13A to 13C, in the method of strengthening a concrete structure using a grid reinforcement material and a non-shrink grout according to the second embodiment of the present disclosure, a surface of a structure to be strengthened 110, e.g., a side surface of a wall body, that is damaged or deteriorated is cleaned (S210). Here, the structure to be strengthened 110 is an old concrete wall body that is damaged or deteriorated, and a side surface of the wall body is strengthened.

Next, a grid fixing device 200a including a first retainer 210 and a spacing pin 230a is mounted on the side surface of the wall body, which is the structure to be strengthened 110 (S220). Here, when the structure to be strengthened 110 is a wall body, although a grid reinforcement material 120 may be fixed to the side surface of the wall body, which is the structure to be strengthened 110, using the anchor pin 230 of the grid fixing device 200 according to the first embodiment, alternatively, the grid reinforcement material 120 may also be mounted using only the spacing pin 230a of the grid fixing device 200a, without fixing using the anchor pin 230 of the grid fixing device 200, so that a predetermined distance may be maintained between the wall body, which is the structure to be strengthened 110, and a wall body side surface formwork 150a. Also, in the case of the grid fixing device 200a according to the second embodiment of the present disclosure, the spacer 220 of the grid fixing device 200 according to the first embodiment of the present disclosure is not required.

In other words, as in the first embodiment described above, the anchor pin 230 of the grid fixing device 200 may be tacked and fixed to the side surface of the wall body, which is the structure to be strengthened 110, using the air tacker or tacking device 400, but instead of the anchor pin 230, the spacing pin 230a may be used to mount the grid reinforcement material 120 on the side surface of the wall body, which is the structure to be strengthened 110. In the method of strengthening a concrete structure using a grid reinforcement material and a non-shrink grout according to the second embodiment of the present disclosure, the spacing pin 230a of the grid fixing device 200a is used to mount the grid reinforcement material 120 on the side surface of the wall body.

Next, as illustrated in FIG. 10C, the grid reinforcement material 120, e.g., a carbon fiber textile grid, is mounted on a side surface of the first retainer 210 of the grid fixing device 200a (S230). Here, the grid reinforcement material 120 is preferably a carbon fiber textile grid made of an incombustible material to improve the fire resistance of the structure to be strengthened 110, but is not limited thereto.

Next, a second retainer 240 of the grid fixing device 200a is fastened so that the spacing pin 230a passes therethrough to fix the grid reinforcement material 120 (S240). Here, the grid reinforcement material 120 is inserted and fixed between the first retainer 210 and the second retainer 240.

Next, an air vent 130 is installed on an upper end portion of the structure to be strengthened 110, and a wall body end portion formwork 140a is installed on each of an upper end portion and a lower end portion of the structure to be strengthened 110 (S250). Here, the wall body end portion formwork 140a may be a balk but is not limited thereto.

Next, the wall body side surface formwork 150a is installed on a side surface of the wall body end portion formwork 140a, and at least one or more grout injection holes 160 are installed in the wall body side surface formwork 150a (S260). Specifically, as illustrated in FIG. 13A, the grout injection hole 160 is installed on a lower end portion of the wall body.

Next, as illustrated in FIG. 13B, non-shrink grout 170 is injected through the grout injection hole 160 and allowed to cure (S270). Here, the non-shrink grout 170 injected through the grout injection hole 160 may be cured while the air vent 130 is controlled and air is discharged.

Next, as illustrated in FIG. 13C, when curing of the non-shrink grout 170 is completed, the wall body side surface formwork 150a and the wall body end portion formwork 140a are removed to finish the strengthening of the wall body, which is the structure to be strengthened 110 (S280). Accordingly, a crack in the structure to be strengthened 110 is automatically filled with the non-shrink grout 170 to strengthen the structure to be strengthened 110.

Meanwhile, FIG. 14A to 14C are views illustrating the arranging of reinforcing bars to strengthen the wall body in the method of strengthening a concrete structure using a grid reinforcement material and a non-shrink grout according to the second embodiment of the present disclosure in detail.

In the method of strengthening a concrete structure using a grid reinforcement material and a non-shrink grout according to the second embodiment of the present disclosure, as illustrated in FIGS. 14A to 14C, reinforcing bars 300 may be additionally arranged to strengthen the old concrete structure.

Here, as illustrated in FIGS. 14A to 14C, additionally arranging the reinforcing bars 300 between the structure to be strengthened 110 and the grid reinforcement material 120 is also advantageous mechanically. Here, the grid reinforcement material 120 serves to increase a cover thickness to prevent corrosion of the reinforcing bars 300.

Figure 15A:
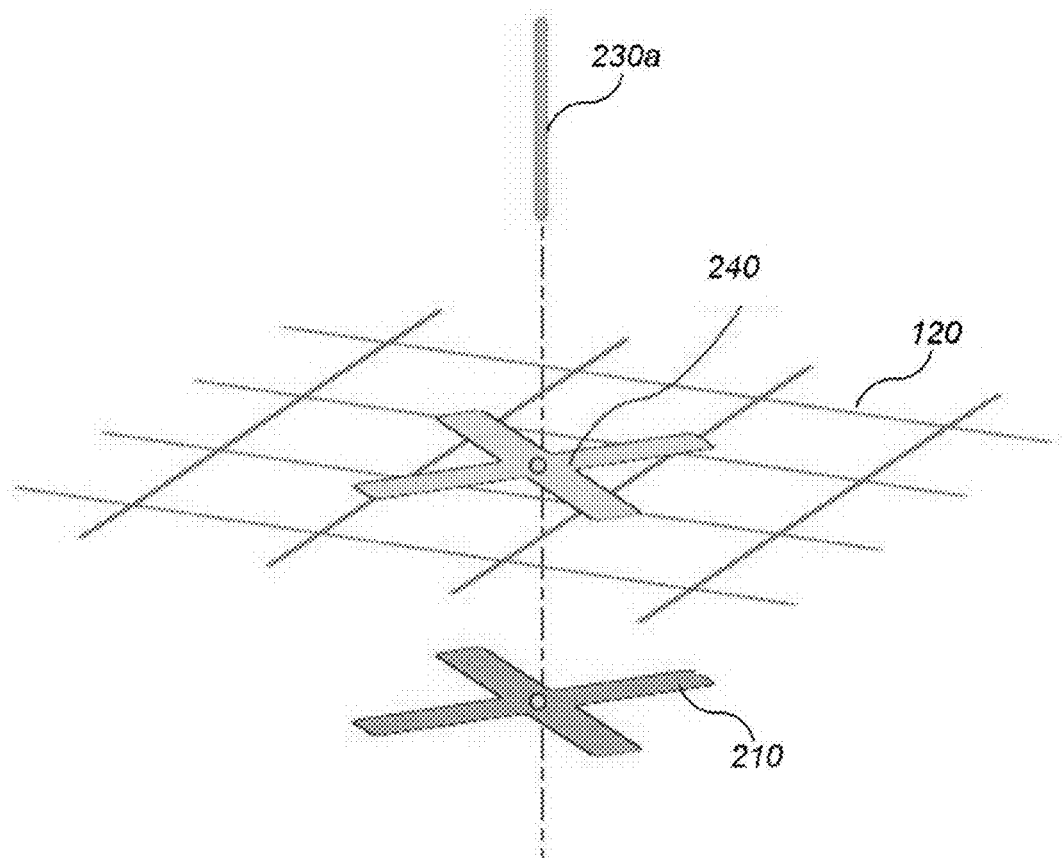
FIGS. 15A and 15B are views illustrating the installing of a grid fixing device without an anchor pin in the method of strengthening a concrete structure using a grid reinforcement material and a non-shrink grout according to the second embodiment of the present disclosure in detail.
Figure 15B:
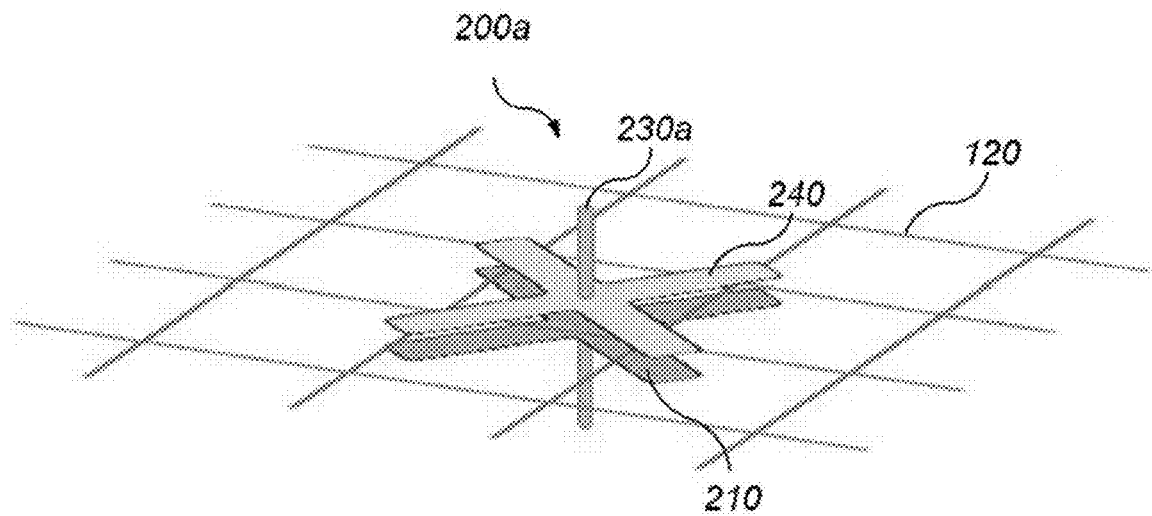

Meanwhile, FIGS. 15A and 15B are views illustrating the installing of a grid fixing device without an anchor pin in the method of strengthening a concrete structure using a grid reinforcement material and a non-shrink grout according to the second embodiment of the present disclosure in detail.

As illustrated in FIGS. 15A and 15B, in the method of strengthening a concrete structure using a grid reinforcement material and a non-shrink grout according to the second embodiment of the present disclosure, when the grid fixing device 200a is installed for the purpose of simply mounting the grid reinforcement material 120 between the structure to be strengthened 110 and the wall body side surface formwork 150a instead of tacking and fixing the grid reinforcement material 120 using the anchor pin 230 of the grid fixing device 200 according to the first embodiment, as illustrated in FIG. 15A, the spacing pin 230a is installed to pass through the first retainer 210 and the second retainer 240 of the grid fixing device 200a, and here, the grid reinforcement material 120 is inserted and fixed between the first retainer 210 and the second retainer 240.

Figure 16A:
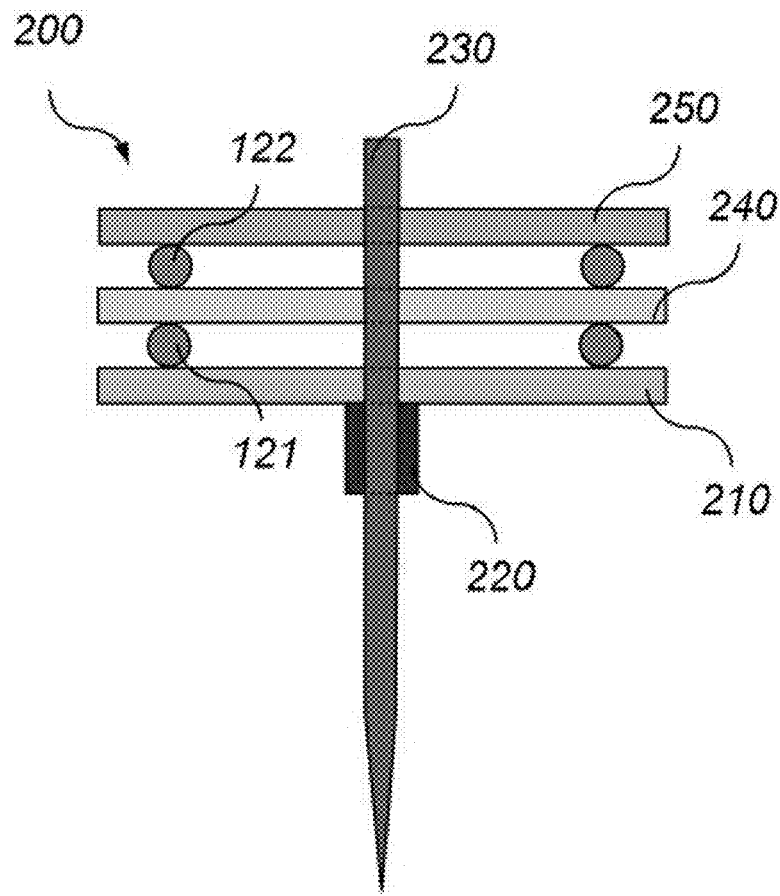
FIGS. 16A and 16B are views illustrating a case in which two or more grid reinforcement materials are mounted in a method of strengthening a concrete structure using a grid reinforcement material and non-shrink grout according to an embodiment of the present disclosure.
Figure 16B:
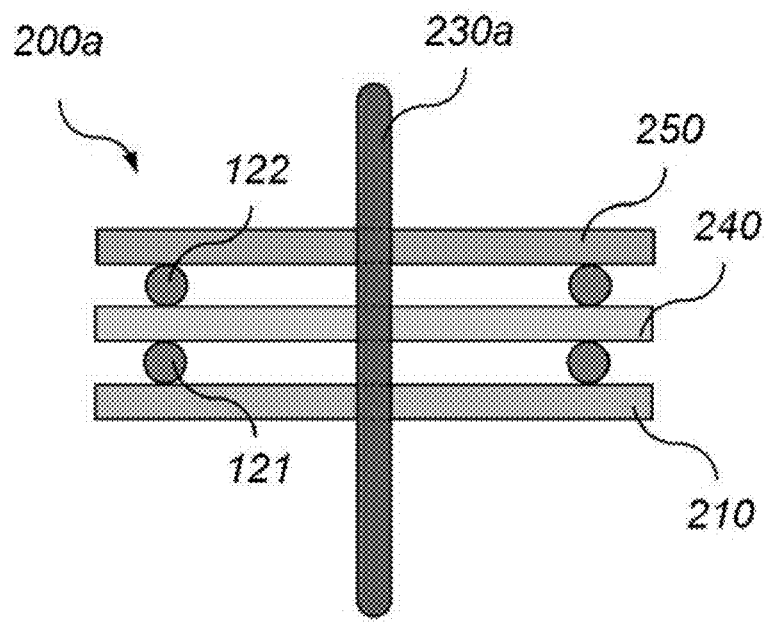

Meanwhile, FIGS. 16A and 16B are views illustrating a case in which two or more grid reinforcement materials are mounted in a method of strengthening a concrete structure using a grid reinforcement material and non-shrink grout according to an embodiment of the present disclosure.

In the method of strengthening a concrete structure using a grid reinforcement material and a non-shrink grout according to the embodiment of the present disclosure, when two or more grid reinforcement materials 121 and 122 are mounted, as illustrated in FIG. 16A, the grid reinforcement materials 121 and 122 may be tacked and fixed to a lower portion of a slab, which is a structure to be strengthened 110, using the anchor pin 230 of the grid fixing device 200 according to the first embodiment, the first grid reinforcement material 121 may be inserted and fixed between a first retainer 210 and a second retainer 240, and the second grid reinforcement material 122 may be inserted and fixed between the second retainer 240 and a third retainer 250.

Also, as illustrated in FIG. 16B, the grid reinforcement materials 121 and 122 may be simply mounted on a side surface of a wall body, which is a structure to be strengthened 110, using the spacing pin 230a of the grid fixing device 200a according to the second embodiment, the first grid reinforcement material 121 may be inserted and fixed between the first retainer 210 and the second retainer 240, and the second grid reinforcement material 122 may be inserted and fixed between the second retainer 240 and the third retainer 250.

Meanwhile, in the method of strengthening a concrete structure using a grid reinforcement material and a non-shrink grout according to the embodiment of the present disclosure, the non-shrink grout 170 is formed by blending as shown in Table 1 below to have excellent adhesion to the structure to be strengthened 110, which is an old concrete structure, to suppress the formation of cracks, and to have high fluidity.

TABLE 1

| Classification | Cement | Fine blast-furnace slag powder | Silica fume | Fine aggregate | Water | High-performance water reducing agent | Polymer expansion material |
| --- | --- | --- | --- | --- | --- | --- | --- |
| Mixing ratio (parts by weight) | 100 parts by weight | 25 to 35 parts by weight | 2 to 3 parts by weight | 140 to 150 parts by weight | 40 to 50 parts by weight | 1.5 to 2.5 parts by weight | 1.2 to 2 parts by weight |
| Example of mixing amount | 680 | 204 | 14 | 942 | 314 | 11 | 9 |

For example, the non-shrink grout 170 may be non-shrink mortar formed by mixing 100 parts by weight of cement, 25 to 35 parts by weight of fine blast-furnace slag powder, 2 to 3 parts by weight of silica fume, 140 to 150 parts by weight of fine aggregate, 40 to 50 parts by weight of water, 1.5 to 2.5 parts by weight of a high-performance water reducing agent, and 1.2 to 2 parts by weight of a polymer expansion material, but is not limited thereto.

Figure 2A:
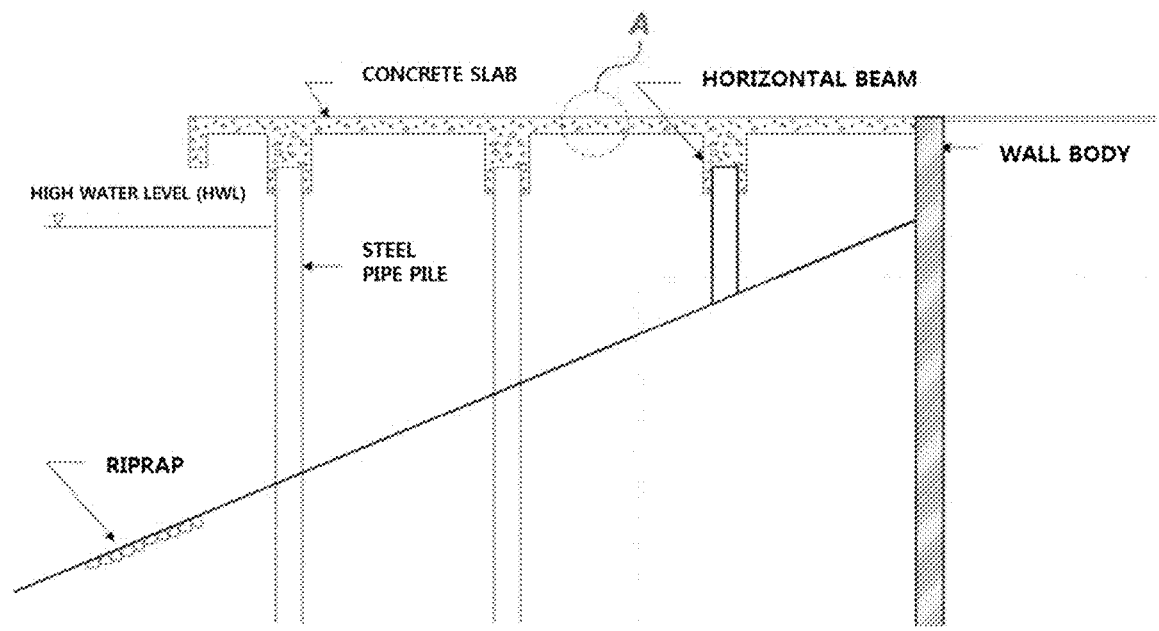
FIGS. 2A and 2B are a view showing an example of a concrete structure that needs to be strengthened.
Figure 2B:
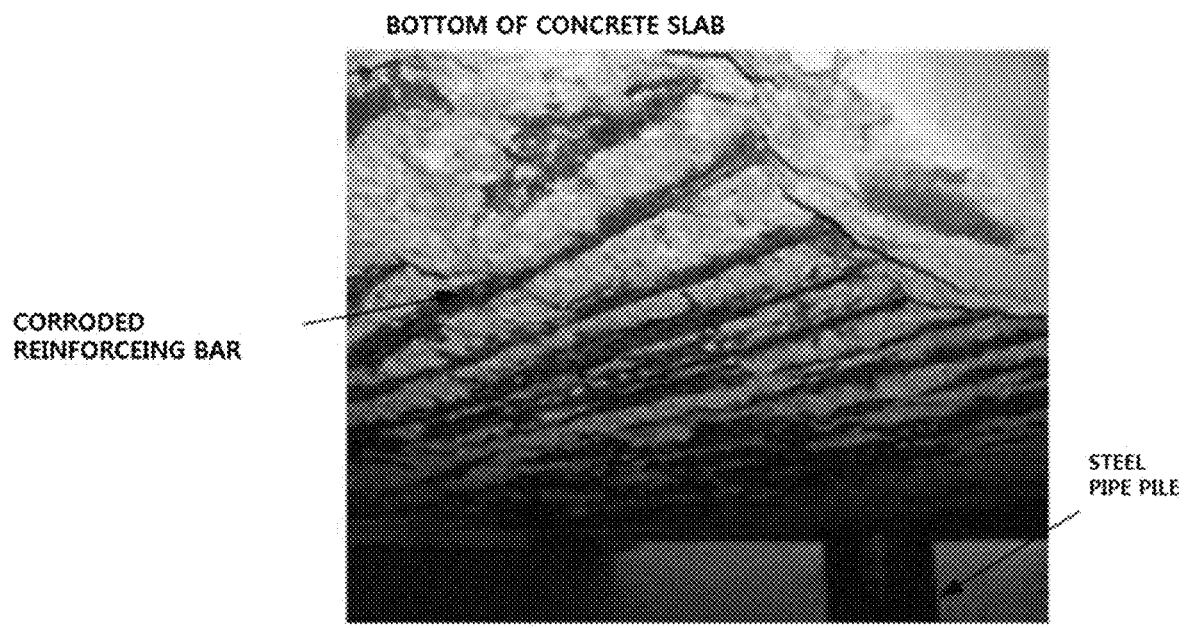

According to the related art, as illustrated in FIG. 2B which has been described above, when a defect in a section occurs due to damage or the like to a concrete slab, the defective section is filled with a reinforcement material such as reinforcement mortar or a fiber reinforcement panel or the like is attached thereto. In this case, a scaffold or the like should be installed on a lower portion of the facility to allow a worker to perform the task.

However, as illustrated in FIG. 2A, in the case of a port structure, installing a scaffold is not possible, and in the case of a high water level (HWL), a worker is unable to approach the lower portion of the facility. Therefore, the working space and working time are very limited. On the other hand, when the method of strengthening a concrete structure using a grid reinforcement material and a non-shrink grout according to the embodiment of the present disclosure is applied, perfect strengthening work may be performed.

Consequently, according to the embodiment of the present disclosure, when strengthening a concrete structure such as a concrete slab or a concrete wall body that is damaged or deteriorated, a grid reinforcement material is mounted on one side of the concrete structure, a formwork is formed on an outer side of the grid reinforcement material to have a required gap, and then the gap is filled with non-shrink grout so that the non-shrink grout is cured therein to strengthen the old concrete structure, thereby being able to automatically fill and repair cracks formed in the concrete structure just by injecting the non-shrink grout without separately performing crack repair on the old concrete structure. Accordingly, there is an advantage in that construction is easy and quick as compared to a conventional repair technique.

Also, according to the embodiment of the present disclosure, the grid reinforcement material may be easily fixed or mounted using a grid fixing device and may be easily applied to strengthening of a concrete structure having a curved surface as well as a concrete structure having a flat surface such as a concrete slab or a concrete wall body.

Also, according to the embodiment of the present disclosure, due to using a carbon fiber textile grid, which is made of an incombustible material, as the grid reinforcement material, the fire resistance of the concrete structure may be improved.

In addition, according to the embodiment of the present disclosure, since reinforcing bars are additionally arranged in a gap between a surface of the concrete structure and the grid reinforcement material, the grid reinforcement material increases a cover thickness, and thus the concrete structure may be remarkably strengthened and corrosion of the reinforcing bars may be prevented.

According to the present disclosure, when strengthening a concrete structure such as a concrete slab or a concrete wall body that is damaged or deteriorated, a grid reinforcement material is mounted on one side of the concrete structure, a formwork is formed on an outer side of the grid reinforcement material to have a required gap, and then the gap is filled with non-shrink grout so that the non-shrink grout is cured therein to strengthen the old concrete structure, thereby being able to automatically fill and repair cracks formed in the concrete structure just by injecting the non-shrink grout without separately performing crack repair on the old concrete structure. Accordingly, there is an advantage in that construction is easy and quick as compared to a conventional repair technique.

According to the present disclosure, the grid reinforcement material can be easily fixed or mounted using a grid fixing device and can be easily applied to strengthening of a concrete structure having a curved surface as well as a concrete structure having a flat surface such as a concrete slab or a concrete wall body.

According to the present disclosure, a carbon fiber textile grid made of an incombustible material can be used as the grid reinforcement material to improve the fire resistance of the concrete structure.

According to the present disclosure, reinforcing bars can be additionally arranged in a gap between a surface of the concrete structure and the grid reinforcement material so that the grid reinforcement material increases a cover thickness, and thus the concrete structure is remarkably strengthened and corrosion of the reinforcing bars is prevented.

The above-given description of the present disclosure is only illustrative, and those of ordinary skill in the art to which the present disclosure pertains should understand that the present disclosure may be modified into other specific forms without changing the technical idea or essential features of the present disclosure. Therefore, the embodiments described above should be understood as illustrative, rather than limiting, in all aspects. For example, each element described as having a single form may be implemented in a distributed manner, and likewise, elements described as being distributed may be implemented in a combined form.

The scope of the present disclosure is shown in the claims below rather than in the detailed description above, and all changes or modifications derived from the meaning and scope of the claims and their equivalents should be interpreted as falling within the scope of the present disclosure.

What is claimed is:

1. A concrete structure strengthened using a grid reinforcement material and a non-shrink grout, which is an old concrete structure that is damaged or deteriorated, the concrete structure comprising:
    a structure to be strengthened of which one side is provided with a grid reinforcement material and a non-shrink grout, wherein the grid reinforcement material is a lattice-type textile grid and is provided to be spaced apart at predetermined intervals on the structure to be strengthened; and
    grid fixing devices each of which includes a first retainer and a second retainer and allows the grid reinforcement material to be inserted and fixed between the first retainer and the second retainer so that the grid reinforcement material is mounted on or fixed to the structure to be strengthened,
    wherein the non-shrink grout is provided through a formwork provided to be spaced apart from the grid reinforcement material,
    wherein the non-shrink grout is configured to fill a crack in the structure to be strengthened to strengthen the structure to be strengthened, and
    wherein, when the structure to be strengthened is a concrete slab, each of the grid fixing device includes:
    the first retainer which has a first through-hole formed in a central portion and which comes in direct contact with the grid reinforcement material, so that the grid reinforcement material is fixed;
    a cylindrical spacer which has a second through-hole formed therein corresponding to the first through-hole and which is integrally formed with a lower surface of the first retainer so that the first retainer maintains a predetermined distance from the structure to be strengthened;
    an anchor pin which is configured to pass through the first through-hole and the second through-hole, so that the anchor pin is tacked into the structure to be strengthened; and
    the second retainer which is formed to be stacked on the first retainer, has a through-hole formed in a central portion, and comes in direct contact with the grid reinforcement material.

2. The concrete structure of claim 1, wherein the grid reinforcement material is a carbon fiber textile grid to improve the fire resistance of the structure to be strengthened, wherein the carbon fiber textile grid is incombustible.

3. The concrete structure of claim 1, wherein the non-shrink grout is formed by mixing 100 parts by weight of cement, 25 to 35 parts by weight of fine blast-furnace slag powder, 2 to 3 parts by weight of silica fume, 140 to 150 parts by weight of fine aggregate, 40 to 50 parts by weight of water, 1.5 to 2.5 parts by weight of a high-performance water reducing agent, and 1.2 to 2 parts by weight of a polymer expansion material.

4. The concrete structure of claim 1, wherein reinforcing bars are additionally arranged between the structure to be strengthened and the grid reinforcement material, and the grid reinforcement material serves to increase a cover thickness for the reinforcing bars to prevent corrosion of the reinforcing bars.

5. A method of strengthening a concrete structure using a grid reinforcement material and a non-shrink grout, the method comprising:
    a) cleaning a surface of a structure to be strengthened that is damaged or deteriorated;
    b) fixing a grid fixing device including a first retainer, a spacer, and an anchor pin to the structure to be strengthened;
    c) mounting a grid reinforcement material on the first retainer of the grid fixing device;
    d) fastening a second retainer of the grid fixing device so that the anchor pin passes therethrough to fix the grid reinforcement material;
    e) installing an air vent and a slab side end portion formwork on each side end portion of the structure to be strengthened;
    f) installing a slab lower portion formwork on the slab side end portion formwork and installing at least one or more grout injection holes in the slab lower portion formwork;
    g) injecting and filling non-shrink grout through the grout injection hole and allowing the non-shrink grout to cure; and
    h) when curing of the non-shrink grout is completed, removing the slab lower portion formwork and the slab side end portion formwork to finish strengthening of the structure to be strengthened,
    wherein a crack in the structure to be strengthened is automatically filled with the non-shrink grout to strengthen the structure to be strengthened, and
    wherein the grid fixing device includes:
    the first retainer which has a first through-hole formed in a central portion and which comes in direct contact with the lattice-type grid reinforcement material so that the grid reinforcement material is fixed;
    the cylindrical spacer which has a second through-hole corresponding to the first through-hole formed therein and which is integrally formed with a lower surface of the first retainer so that the first retainer maintains a predetermined distance from the structure to be strengthened;
    the anchor pin which is tacked using a tacker or tacking device and which passes through the first through-hole and the second through-hole to be tacked into the structure to be strengthened; and
    the second retainer which is formed to be stacked on the first retainer, has a through-hole formed in a central portion, and comes in direct contact with the grid reinforcement material.

6. The method of claim 5, wherein the structure to be strengthened is an old concrete slab that is damaged or deteriorated, and a lower portion of the slab may be strengthened.

7. The method of claim 5, wherein the grid reinforcement material of step c) is a carbon fiber textile grid made of an incombustible material to improve the fire resistance of the structure to be strengthened.

8. The method of claim 5, wherein, in step d), the grid reinforcement material is inserted and fixed between the first retainer and the second retainer.

9. The method of claim 5, wherein, in step g), the non-shrink grout injected through the grout injection hole is injected and filled while air discharge is controlled through the air vent.

10. The method of claim 5, wherein the non-shrink grout is formed by mixing 100 parts by weight of cement, 25 to 35 parts by weight of fine blast-furnace slag powder, 2 to 3 parts by weight of silica fume, 140 to 150 parts by weight of fine aggregate, 40 to 50 parts by weight of water, 1.5 to 2.5 parts by weight of a high-performance water reducing agent, and 1.2 to 2 parts by weight of a polymer expansion material.

11. A method of strengthening a concrete structure using a grid reinforcement material and a non-shrink grout, the method comprising:
   a) cleaning a surface of a structure to be strengthened that is damaged or deteriorated;
   b) mounting a grid fixing device including a first retainer and a spacing pin on a side surface of a wall body, which is the structure to be strengthened;
   c) mounting a grid reinforcement material on a side surface of the first retainer of the grid fixing device;
   d) fastening a second retainer of the grid fixing device so that the spacing pin passes therethrough to fix the grid reinforcement material;
   e) installing an air vent on an upper end portion of the structure to be strengthened and installing a wall body end portion formwork on each of an upper end portion and a lower end portion of the structure to be strengthened;
   f) installing a wall body side surface formwork on a side surface of the wall body end portion formwork and installing at least one or more grout injection holes in the wall body side surface formwork;
   g) injecting and filling non-shrink grout through the grout injection hole and allowing the non-shrink grout to cure; and
   h) when curing of the non-shrink grout is completed, removing the wall body side surface formwork and the wall body end portion formwork to finish strengthening of the structure to be strengthened,
   wherein a crack in the structure to be strengthened is automatically filled with the non-shrink grout to strengthen the structure to be strengthened, and
   wherein the non-shrink grout is formed by mixing 100 parts by weight of cement, 25 to 35 parts by weight of fine blast-furnace slag powder, 2 to 3 parts by weight of silica fume, 140 to 150 parts by weight of fine aggregate, 40 to 50 parts by weight of water, 1.5 to 2.5 parts by weight of a high-performance water reducing agent, and 1.2 to 2 parts by weight of a polymer expansion material.

12. The method of claim 11, wherein the structure to be strengthened is an old concrete wall body that is damaged or deteriorated, and a side surface of the wall body is strengthened.

13. The method of claim 11, wherein the grid reinforcement material of step c) is a carbon fiber textile grid made of an incombustible material to improve the fire resistance of the structure to be strengthened.

14. The method of claim 11, wherein, in step d), the grid reinforcement material is inserted and fixed between the first retainer and the second retainer.

15. The method of claim 11, wherein the grid fixing device includes:
   the first retainer which has a first through-hole formed in a central portion and which comes in direct contact with the lattice-type grid reinforcement material so that the grid reinforcement material is fixed;
   the spacing pin which passes through the first through-hole of the first retainer to maintain a distance between the structure to be strengthened and a wall body side surface formwork; and
   the second retainer which is formed to be stacked on the first retainer, has a through-hole formed in a central portion, and comes in direct contact with the grid reinforcement material.

16. The method of claim 11, wherein, in step g), the non-shrink grout injected through the grout injection hole is injected and filled while air discharge is controlled through the air vent.

17. The method of claim 11, wherein reinforcing bars are additionally arranged between the structure to be strengthened and the grid reinforcement material, and the grid reinforcement material serves to increase a cover thickness to prevent corrosion of the reinforcing bars.

* * * * *